US012783433B2

(12) United States Patent

Zaglewski et al.

(10) Patent No.: US 12,783,433 B2

(45) Date of Patent: Nov. 3, 2026

(54) NEURAL NETWORK ACCELERATOR WITH MEMORY HAVING BANK-SPECIFIC CLOCK DOMAIN CROSSING BUFFERS

(71) Applicant: Intel Corporation, Santa Clara, CA (US)

(72) Inventors: Robert Cezary Zaglewski, Folsom, CA (US); Deepak Abraham Mathaikutty, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/954,764

(22) Filed: Nov. 21, 2024

(65) Prior Publication Data

US 2025/0086125 A1 Mar. 13, 2025

Related U.S. Application Data

(60) Provisional application No. 63/666,863, filed on Jul. 2, 2024.

(51) Int. Cl.
*G06F 12/00* (2006.01)
*G06F 13/16* (2006.01)

(52) U.S. Cl.
CPC ...... *G06F 13/1673* (2013.01); *G06F 13/1689* (2013.01)

(58) Field of Classification Search
CPC ......................... G06F 13/1673; G06F 13/1689
See application file for complete search history.

(56) References Cited

U.S. PATENT DOCUMENTS

| | | | |
|---|---|---|---|
| 11,169,937 B2 | 11/2021 | Kanoh | |
| 11,232,027 B2 | 1/2022 | Ishii et al. | |
| 11,295,206 B2 | 4/2022 | Rajamani et al. | |
| 2018/0074704 A1 | 3/2018 | Teh | |

(Continued)

FOREIGN PATENT DOCUMENTS

WO 2024058810 A1 3/2024

OTHER PUBLICATIONS

Bernstein, Liane et al "Freely scalable and reconfigurable optical hardware for deep learning", Scientific Reports., 2021, 11.10.1038/s41598-021-82543-3; 13 pages.

(Continued)

*Primary Examiner* — Arvind Talukdar

(74) *Attorney, Agent, or Firm* — Akona IP PC

(57) ABSTRACT

An accelerator may include one or more data processing units that perform deep learning operations in neural networks. A data processing unit includes a memory and a compute engine. The memory may include memory banks and clock domain crossing (CDC) buffers. Each memory bank may have its own CDC buffer(s). The memory banks may be grouped into bank groups. The memory may also include a group selection module and bank selection modules, each of which is associated with a different bank group. The group selection module may select a bank group for a data transfer request from the compute engine. The bank selection module of the selected bank group may select a memory bank from the selected bank group and store the data transfer request in a CDC buffer of the selected memory bank. The data transfer request may be transmitted to the selected memory bank from the CDC buffer.

20 Claims, 12 Drawing Sheets

(56) References Cited

U.S. PATENT DOCUMENTS

| | | | | |
|---|---|---|---|---|
| 2019/0129651 | A1 | 5/2019 | Wuu et al. | |
| 2019/0205284 | A1* | 7/2019 | Fleming | G06F 9/542 |
| 2019/0392287 | A1* | 12/2019 | Ovsiannikov | G06F 17/153 |
| 2021/0318929 | A1 | 10/2021 | Guim Bernat et al. | |
| 2022/0121570 | A1 | 4/2022 | Eilert et al. | |
| 2022/0328078 | A1 | 10/2022 | Linstadt et al. | |
| 2022/0374691 | A1* | 11/2022 | Bae | G06F 15/167 |
| 2023/0315297 | A1* | 10/2023 | Oh | G11C 7/1093 711/154 |
| 2023/0334289 | A1 | 10/2023 | Zaglewski et al. | |
| 2024/0143457 | A1 | 5/2024 | Sity et al. | |
| 2024/0330665 | A1* | 10/2024 | Kim | G06N 3/045 |
| 2025/0384001 | A1* | 12/2025 | Nguyen | G06F 13/28 |

OTHER PUBLICATIONS

Du, Wenquan et al "Optimizing of convolutional neural network accelerator", Green Electronics. InTech, Jun. 20, 2018. doi: 10.5772/intechopen.75796; pp. 147-166.

Intel® Movidius™ Vision Processing Units (VPUs), retrieved from https://www.intel.com/content/www/us/en/products/details/processors/movidius-vpu/movidius-myriad-x.html retrieved on Aug. 18, 2022, 3 pages.

Klotz, Aaron, "Intel confirms new meteor lake ASIC for big AI performance boost", Tom's Hardware, published Jul. 29, 2022, 4 pages.

Schor, David "IEDM 2022 : Did we just witness the death of SRAM?", WikiChip Fuse, Dec. 14, 2022, 7 pages.

Woo, Steven "Memory for AI: Two Edges and a Roofline", Electronic Design, Mar. 12, 2021, 11 pages.

* cited by examiner

NEURAL NETWORK ACCELERATOR WITH MEMORY HAVING BANK-SPECIFIC CLOCK DOMAIN CROSSING BUFFERS

CROSS-REFERENCE TO RELATED APPLICATION

This application claims the benefit of U.S. Provisional Patent Application No. 63/666,863, filed Jul. 2, 2024, and titled "MEMORY CLOCK CROSSING IN MULTI-PORT NEURAL NETWORK ACCELERATOR," which is incorporated by reference in its entirety.

TECHNICAL FIELD

This disclosure relates generally to deep neural networks (DNN), and more specifically, DNN accelerators with memories that have bank-specific clock domain crossing (CDC) buffers.

BACKGROUND

DNNs are used extensively for a variety of artificial intelligence applications ranging from computer vision to speech recognition and natural language processing due to their ability to achieve high accuracy. However, the high accuracy comes at the expense of significant computation cost. DNNs have extremely high computing demands as each inference can require hundreds of millions of MAC (multiply-accumulate) or other types of operations as well as a large amount of data to read and write. Therefore, techniques to improve efficiency of DNNs are needed.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1:
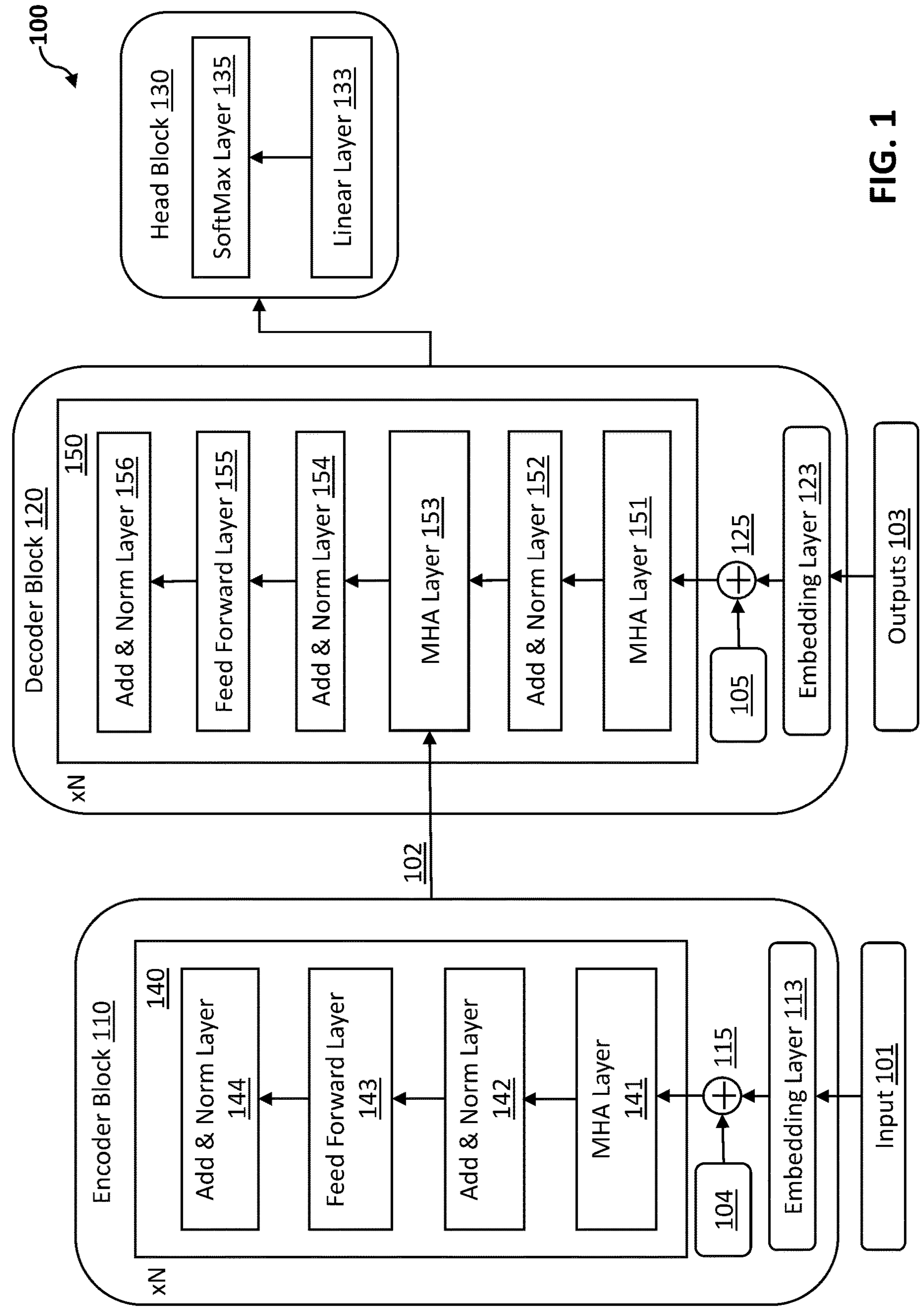
FIG. 1 illustrates an example transformer model, in accordance with various embodiments.

The last decade has witnessed a rapid rise in AI (artificial intelligence) based data processing, particularly based on DNNs. DNNs are widely used in the domains of computer vision, speech recognition, image, and video processing mainly due to their ability to achieve beyond human-level accuracy. The significant improvements in DNN model size and accuracy coupled with the rapid increase in computing power of execution platforms have led to the adoption of DNN applications even within resource constrained mobile and edge devices that have limited energy availability.

A DNN layer may include one or more deep learning operations, such as convolution, layer normalization, matrix multiplication, pooling, elementwise operation, linear operation, nonlinear operation, and so on. A deep learning operation in a DNN may be performed on one or more internal parameters of the DNNs (e.g., weights), which are determined during the training phase, and one or more activations. An activation may be a data point (also referred to as "data elements" or "elements"). Activations or weights of a DNN layer may be elements of a tensor of the DNN layer. A tensor is a data structure having multiple elements across one or more dimensions. Example tensors include a vector, which is a one-dimensional tensor, and a matrix, which is a two-dimensional tensor. There can also be three-dimensional tensors and even higher dimensional tensors. Taking a convolutional layer for example, it may have an input tensor (also referred to as "input feature map (IFM)") including one or more input activations (also referred to as "input elements") and a weight tensor including one or more weights. A weight is an element in the weight tensor. A weight tensor of a convolution may be a kernel, a filter, or a group of filters. The output data of the convolutional layer may be an output tensor (also referred to as "output feature map (OFM)") that includes one or more output activations (also referred to as "output elements").

Deep Learning technology has witnessed unprecedented advancements and widespread adoption across various domains. For instance, CNN and Transformer Neural Networks (TNN) are influential in image recognition, natural language processing, and recommendation systems. One of the primary drivers of this growth is the availability of vast amounts of data, coupled with the explosion of newly developed DNN architectures and hardware systems on which those workloads can be accelerated. These developments have enabled training increasingly complex DNN, allowing them to solve complex real-world problems and empower machines to make crucial decisions that drive business and growth. Deep learning in data center typically has access to large compute resources and data for training DNN models, while deployment of DNN at the edge is receiving attention to overcome latency and bandwidth restriction and to mitigate privacy concerns. However, enabling DNN models at the edge has its challenges. Edge devices often have limited computational and memory resources compared to cloud servers. This can impose restrictions on the complexity and size of DNN models that can be successfully deployed. On the other hand, energy efficiency is a crucial aspect for edge devices, particularly for battery-powered devices, such as laptops, smartphones, etc.

DNNs in edge devices often execute on DNN accelerators which are specialized processors built to accelerate the computation required for neural networks. A DNN accelerator may include an array of PEs, array of Digital Signal Processors (DSPs), on-chip-memory built out of static random-access memories (SRAMs), Direct Memory Access (DMA) module, control modules, and micro-controller (uC) for task scheduling and accelerator management. The PEs may be the computational units responsible for performing the core operations involved in DNN execution (e.g., DNN execution for training or inference), specifically designed to efficiently execute operations such as matrix multiplication, convolution, activation function, pooling operation, and so on. The DSPs may also provide computational capacity but because of its general capability, layers which are not supported by PEs can be executed on them. The on-chip memory may provide a low-power, low-latency, and high bandwidth storage capacity, while the DMA module may allow pipelined movement of data between off-chip and on-chip memory. The control module may provide hardware-based task synchronization.

The complexity of performing DNN execution may depend on the number of parameters in the model, and it can directly impact on the storage size and bandwidth requirements of the memories (e.g., off-chip memory (DRAM) or on-chip memory (SRAM)). The number of parameters in DNNs has been increasing as larger and more complex models are developed to improve accuracy and performance of the networks. This rapid increase in model complexity, compute capacity of DNN accelerator can grow steadily across product generation due to technology process improvements as well as architectural innovations. With the increase in computation power, memory bandwidth can be a greater bottleneck as more DNN layers are not able to reach accelerator's peak performance. This trend is further exacerbated by the scaling seen in latest process nodes where standard cells (logic) outpace SRAM memories in density and performance improvements. Therefore, utilization of the memory bandwidth efficiently while ensuring small area footprint and power consumption becomes a crucial problem to solve to address the performance bottleneck due to memory bound DNN-based applications. The continuous innovation in AI-PC era can lead to further deployment of even more complex and bandwidth demanding DNNs (such as LLMs) that require further increase of on-chip memory bandwidth.

A way to add more bandwidth into on-chip memory is through increasing the port width (e.g., from 32B to 64B/128B) or by adding more ports for PEs (e.g., 8 to 16) to generate request to memory. Doubling/quadrupling the port width has limited benefit as PEs and DSPs do not always take full advantage of wider data payload without discarding part of it primarily due to the data alignment requirements of the data fetch. Narrower memory fetches can give better flexibility for PEs and DSPs and provide better utilization of fetched data. On the other hand, the growing number of ports between PEs array and on-chip memory has major area disadvantages for area and power as interconnects and clock crossing structures need to be replicated, which can result in a huge increase in area and power. It can further be exacerbated in designs that have multiple independent CDC buffers placed between port and multiplexers of the interconnect fabric to allow simultaneous paths from single fast clock domain port to multiple slow clock domain memories. That can lead to area and power disadvantage in configurations where number of ports grows to the point where it reaches or exceeds number of memory bank in the on-chip memory. For instance, the area footprint of CDC FIFOs may count to a significant portion (e.g., about half) of overall on-chip flip-flop count.

Embodiments of the present disclosure provide DNN accelerators with memories that have bank-specific CDC buffers. For instance, a memory (e.g., an on-chip memory) in an example DNN accelerator of the present disclosure may have a topology that can improve the performance of load and drain bandwidth bound layers from DNN-based applications by restructuring the multi-domain interconnect crossings to allow for simultaneous access from the faster clock domain PEs to the slower clock domain groups of SRAM banks. Also, CDC buffers are placed at the memory bank side of the fabric. For instance, each memory bank may have its own CDC buffer(s), which may be placed between the memory bank and a bank selection module coupled to multiple memory banks. Such a memory topology can reduce area footprint and power even when the number of fast clock domain ports between the PE array and the memory grows to a point where it equals or exceeds the number of memory banks. It can also improve the overall latency from the PE array to the on-chip memory and therefore can further improve network level performance and reduce both leakage and dynamic power.

In various embodiments of the present disclosure, a DNN accelerator may include one or more data processing units (DPUs), a memory (e.g., a DRAM), and a DMA engine. Each DPU may be implemented as a chip, and the memory may be an off-chip memory. A DPU may also be referred to as a compute tile or compute block. A DPU may include a memory (e.g., a SRAM) and a PE array. This memory may be local to the DPU and may be an on-chip memory. The local memory can store data used or generated by the PE array. The local memory may receive data transfer requests (also referred to as "requests") from one or more access ports associated with the PE array. The data transferred requests may be generated by the PEs or a control module in the DPU. A data transfer request may be a request to read data (e.g., data to be used by the PE array for performing a deep learning operation) from the local memory or write data (e.g., data computed by the PE array by performing a deep learning operation) into the local memory. A data transfer request may include the data to be read or written, one or more memory addresses where the data is to be read or written, or other information.

The local memory includes bank groups, each of which includes a set of memory banks. The memory banks may be grouped in accordance with DNN-centric traffic patterns on the access ports of the PEs to increase the memory bandwidth utilization and minimize memory access contention. The local memory may also include a group selection module. Each bank group may include a bank selection module (e.g., a demultiplexer) and CDC buffers in addition to the memory banks in the bank group. The access ports and group selection module may be a clock domain that is faster than the clock domain of the bank groups. The CDC buffers facilitate data transfer between the two clock domains. A CDC buffer may be a first-in-first-out (FIFO) buffer. Each CDC buffer may be specific to a particular memory bank. The group selection module may select a bank group for a data transfer request received by the local memory and send the data transfer request to the bank selection module in the selected bank group. The bank selection module may then select a memory bank in the selected bank group and store the data transfer request (or part of the data transfer request) in a CDC buffer coupled to the selected memory bank. Data can be read from or written into the selected memory bank from the CDC buffer. The memory bank can also provide a response to the data transfer request, which can be sent to another CDC buffer coupled to the memory bank. The response can then be read from the CDC buffer and sent to the bank selection module, further to the group selection module, then to the access ports of the PE array. The PE array can receive the response through the access ports. The group selection module can send consecutive requests to different groups, which can boost the bandwidth utilization. The memory bandwidth improvement can enable higher computation efficiency by better PE utilization and less starvation. Despite these advantages, the two-level memory topology does not require significantly more power or area. Rather, it can lead to less wasted compute cycles and energy savings given the improved bandwidth utilization.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase "A or B" or the phrase "A and/or B" means (A), (B), or (A and B). For the purposes of the present disclosure, the phrase "A, B, or C" or the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicates that different instances of like objects are being referred to and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value as described herein or as known in the art. Similarly, terms indicating orientation of various elements, e.g., "coplanar," "perpendicular," "orthogonal," "parallel," or any other angle between the elements, generally refer to being within +/−5-20% of a target value as described herein or as known in the art.

In addition, the terms "comprise," "comprising," "include," "including," "have," "having" or any other variation thereof, are intended to cover a non-exclusive inclusion. For example, a method, process, device, or DNN accelerator that comprises a list of elements is not necessarily limited to only those elements but may include other elements not expressly listed or inherent to such method, process, device, or DNN accelerators. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description below and the accompanying drawings.

FIG. 1 illustrates an example transformer model 100, in accordance with various embodiments. The transformer model 100 may be executed by a DNN accelerator, e.g., the DNN accelerator 302 in FIG. 3. The transformer model 100 may transform input sequences into output sequences. In some embodiments, the transformer model 100 is a DNN that can learn context and meaning by tracking relationships in sequential data, such as sequential words in a sentence, sequential audio signals, sequential images, and so on. In an example, the transformer model 100 may be at least part of a large language model (LLM). The transformer model 100 includes an encoder block 110, a decoder block 120, and a head block 130. In other embodiment, different or additional components may be included in the transformer model 100. Further, functionality attributed to a component of the transformer model 100 may be accomplished by a different component included in the transformer model 100 or a different model or module.

The encoder block 110 receives input sequences and generates matrix representations of the input sequences. In the embodiments of FIG. 1, the encoder block 110 receives an input 101 and generates an encoder output 102. The input 101 may be an input prompt. In some embodiments, the input 101 may include one or more input tokens, such as words, phrases, sentences, images, audio signals, other types of input tokens, or some combination thereof. In an example, the input 101 may include a prompt received from a user of the transformer model 100. The prompt may include a question or request made by the user. A word in the prompt may be an input token. The encoder output 102 may include one or more vectors that are contextualized representations of the input 101. Each vector in the encoder output 102 may represent a token in the input 101 with contextual understanding.

The encoder block 110 includes an embedding layer 113, a positional encoding layer 115, and a plurality of layers 140 (individually referred to as "layer 140"). In other embodiments, the encoder block 110 may have different, fewer, or more components. Also, the arrangement of the components in the encoder block 110 may be different from the arrangement shown in FIG. 1. For the purpose of illustration, the encoder block 110 has N layers in FIG. 1, where N is an integer. Each layer 140 may include one or more neural network operations. The layers 140 may transform a sequence of embeddings into a representation that encapsulates the learned information from the input 101. Different layers 140 may have different internal parameters, e.g., different weights, bias, or other types of internal parameters. In some embodiments, the layers 140 have identical components. The components in a layer 140 may be layers and may also be referred to as sub-layers of the layer 140. As shown in FIG. 1, a layer 140 includes four sub-layers: a multi-head attention (MHA) layer 141, an add & norm layer 142, a feed forward layer 143, and another add & norm layer 144.

The decoder block 120 iteratively generates outputs 103 using encoded representations generated by the encoder block 110. The decoder block 120 includes an embedding layer 123, a positional encoding layer 125, and a plurality of layers 150 (individually referred to as "layer 150"). For the purpose of illustration, the decoder block 120 has N layers in FIG. 1, where N is an integer. In the embodiments of FIG. 1, the number of layers 150 in the decoder block 120 is the same as the number of layers 140 in the encoder block 110. In other embodiments, the number of layers 150 in the decoder block 120 may be different from the number of layers 140 in the encoder block 110. Each layer 150 may include one or more neural network operations. Different layers 150 may have different internal parameters. In some embodiments, the layers 150 may have identical components. The components in a layer 150 may be layers and may also be referred to as sub-layers of the layer 150. As shown in FIG. 1, a layer 150 includes six sub-layers: an MHA layer 151, an add & norm layer 152, an encoder-decoder attention layer 153, another add & norm layer 154, a feed forward layer 155, and another add & norm layer 156.

In some embodiments, a sequence of inference stages is performed in the decoder block 120 using encoder outputs, e.g., the encoder output 102. A matrix may be predicted through each inference stage. The outputs 103 may include a plurality of matrices. Each matrix may be further processed in the head block 130 to predict a token. The plurality of matrices may be used to predict a sequence of tokens. For the first inference stage, the decoder block 120 may receive one or more start tokens as input tokens and compute a first matrix from the input tokens and the output of the encoder block 110. The first matrix may be used by the head block 130 to predict the first token. The predicted token may be used as a new input token, in addition to the start token(s), in the second inference stage. Similarly, a second token may be predicted through the second inference stage and may be used in the third inference stage. This iteration may continue till all the inference stages are complete.

The head block 130 receives the output of the decoder block 120 and processes it in a linear layer 133 and a SoftMax layer 135. A linear operation may be performed on the output of the decoder block 120 in the linear layer 133. The linear operation may include a multiplication of the output of the decoder block 120 with a weight matrix. The output of the linear layer 133 may be a vector. In some embodiments, the head block 130 may function as a classifier. The number of data elements in the vector computed in the linear layer 133 may depend on the number of classes involved. In an example where there are M classes, where M is an integer, the vector computed in the linear layer 133 may have M data elements representing the prediction for the M classes, respectively.

The output of the linear layer 133 may be input into the SoftMax layer 135. A SoftMax function may be applied on the output of the linear layer 133 to compute probability scores. A probability score may have a value in the range from 0 to 1. In some embodiments, a probability value is computed for each data element in the vector computed in the linear layer 133. The highest one of the probability scores may be the key. The corresponding index of the key may point to the token that the transformer model 100 predicts as the next in the sequence. The final output of the transformer model 100 may be the sequence of predicted tokens. In some embodiments, the head block 130 may be a language modeling head.

An embedding layer (e.g., the embedding layer 113 or the embedding layer 123) converts an input of the embedding layer (e.g., the input 101 or the outputs 103) into one or more embeddings. An embedding may be a vector, which is also referred to as an embedding vector or a vector embedding. The vector embedding may include a sequence of data elements. In some embodiments, the embedding layer 113 may generate a plurality of embeddings, each of which may be converted from a different input token in the input 101. The embeddings may capture the semantic meaning of the tokens in the input 101. The embeddings may be numerical representations that capture the relationships or meanings of words, phrases, or other data types. In an example where the input 101 is a prompt including a sequence of words, the embedding layer 113 may generate an embedding from each word in the input 101. The embedding layer 123 in the decoder block 120 may generate a plurality of embeddings from tokens received by the decoder block 120 in a similar manner as the embedding layer 113.

A positional encoding layer (e.g., the positional encoding layer 115 or the positional encoding layer 125) performs positional encoding on embeddings generated in the corresponding embedding layer. In some embodiments, the positional encoding layer may apply one or more positional encoding vectors (e.g., a positional encoding vector 104 or positional encoding vector 105) on vector embeddings from the corresponding embedding layer to generate new vector embeddings that represents the embeddings with positional context. The positional encoding vector may encode information about the position of the embedding in a sequence of embeddings. In some embodiments, the positional encoding layer performs an addition operation on a positional encoding vector and a vector embedding. The addition operation may be elementwise addition. The positional encoding layer may output an embedding matrix that includes the vector embeddings computed in the positional encoding layer.

An MHA layer (e.g., the MHA layer 141, the MHA layer 151, or the MHA layer 153) may implement a multi-head attention mechanism, which may be a multi-head self-attention mechanism or a multi-head cross-attention mechanism. In some embodiments, the MHA layer 141 or the MHA layer 151 may implement a self-attention mechanism. For self-attention, the queries, keys, and values may come from the same place. For instance, for the MHA layer 141, the queries, keys, and values may all come from the positional encoding layer 115. For the MHA layer 151, the queries, keys, and values may all come from the positional encoding layer 125. The self-attention mechanism may enable the transformer model 100 to relate each token with other tokens. The MHA layer may compute attention scores from embeddings generated in the corresponding positional encoding layer. In some embodiments, the MHA layer may receive one or more queries, one or more keys, and one or more values. In some embodiments, the MHA layer has a number of heads that receive different linearly projected versions of the queries, keys, and values and produce outputs in parallel that are then used to generate the final result.

In some embodiments, the queries, keys, and values input into the MHA layer 141 may be computed from vector embeddings generated by the positional encoding layer 115. The queries, keys, and values input into the MHA layer 151 may be computed from vector embeddings generated by the positional encoding layer 125. A query, key, or value may be a vector the represents a token in a sequence. In some embodiments, a query matrix $Q \in \mathbb{R}^{N \times h}$ may be computed by multiply an embedding matrix $X \in \mathbb{R}^{N \times d}$ (e.g., an embedding matrix computed in a positional encoding layer) with a weight matrix $W_q \in \mathbb{R}^{d \times h}$, where d is the dimension of a vector embedding, N is the number of vector embeddings in the embedding matrix, and h is the number of attention heads. Each row in the query matrix may be a query. A key matrix $K \in \mathbb{R}^{N \times h}$ may be computed by multiple an embedding matrix $X \in \mathbb{R}^{N \times d}$ (e.g., an embedding matrix computed in a positional encoding layer) with a weight matrix $W_k \in \mathbb{R}$ dx Each row in the key matrix may be a key. A value matrix $V \in \mathbb{R}^{N \times h}$ may be computed by multiple an embedding matrix $X \in \mathbb{R}^{N \times d}$ (e.g., an embedding matrix computed in a positional encoding layer) with a weight matrix $W_v \in \mathbb{R}^{d \times h}$. Each row in the value matrix may be a value.

In some embodiments, the MHA layer 151 may implement masked multi-head self-attention. The MHA layer 151 may prevent positions from attending to subsequent positions. For instance, each token in the sequence may not be influenced by future tokens. This masking can ensure that the predictions of a particular position can depend on known outputs at positions before it and not depend on unknown outputs at positions after it.

In some embodiments, the MHA layer 153 may implement a cross-attention mechanism, such as encoder-decoder cross-attention. The MHA layer 153 may use outputs from the previous layer (i.e., the add & norm layer 152) as queries and use outputs from the encoder block 110 as keys and values. The cross-attention can align the encoder's input with the decoder's, empowering the decoder block 120 to identify and emphasize the most relevant parts of the encoder's input.

An add & norm layer in the transformer model 100, such as the add & norm layer 142, 144, 152, 154, and 156, has an addition operation followed by a layer normalization operation. The addition operation may be an addition of the output of the preceding layer and the input of the preceding layer. The preceding layer is a layer that is arranged right before the add & norm layer. For example, the preceding layer of the add & norm layer 142 is the MHA layer 141. As another example, the preceding layer of the add & norm layer 154 is the encoder-decoder attention layer 153.

Then the layer normalization operation is applied on the result of the addition operation, which may be denoted as LayerNorm(x+sublayer(x)), where LayerNorm denotes layer normalization, x is the input of the preceding layer, and sublayer(x) denotes the output of the preceding layer. In some embodiments, the layer normalization operation may include a sequence of computations. In an example, the layer normalization operation may include a mean computation, which may be denoted as $$\mu_{xy} = \frac{1}{Z} \times \sum_{z=1}^{Z} A_{xyz},$$

where $A_{xyz}$ denotes a data element in the input tensor, x may be the positional index of the data element in one of the spatial dimensions, y may be the positional index of the data element in the other one of the spatial dimensions, z may be the positional index of the data element in the channel dimension, and $\mu_{xy}$ denotes the output of the mean computation, which may be a 2D matrix. The mean computation may be channel-wise reduction operation. The layer normalization operation may convert $\mu_{xy}$ to a 3D tensor $\mu_{xyz}$, e.g., by replicating every data element over z output points.

The layer normalization operation may also include an elementwise subtraction, which may be denoted as $D_{xyz} = A_{xyz} - \mu_{xyz}$. The layer normalization operation may further include a variance computation denoted as $$\sigma_{xy}^2 = \sum_{z=1}^{Z} D_{xyz}^2$$

and a division computation denoted as $$M_{xy} = \frac{1}{\sqrt{\frac{1}{Z} \times (\sigma_{xy}^2 + \epsilon \times Z)}}.$$

$M_{xy}$ may be a 2D tensor. The layer normalization operation may also convert $M_{xy}$ to a 3D tensor $M_{xyz}$, e.g., by replicating every data element over z output points. Further, the layer normalization operation may have an element multiplication denoted as $$A'_{xyz} = \frac{A_{xyz} - \mu_{xyz}}{\sqrt{\frac{1}{Z} \times (\sigma_{xy}^2 + \epsilon)}} = (A_{xyz} - \mu_{xyz}) \times \frac{1}{\sqrt{\frac{1}{Z} \times (\sigma_{xy}^2 + \epsilon)}} = D_{xyz} \times M_{xyz}.$$

The layer normalization operation may further compute $$A''_{xyz} = A'_{xyz} + \frac{\beta_z}{\gamma_z}$$

and $LN_{xyz} = A\text{"}xyz_{xyz} \times \gamma_z$. $LN_{xyz}$ may be the output of the layer normalization operation.

A feed forward layer (e.g., the feed forward layer 143 and the feed forward layer 155) may be a position-wise fully-connected feed forward network. In an example, the feed forward layer may include two linear layers with an activation function in between. An example of the activation function is Rectified Linear Unit (ReLU).

Figure 2:
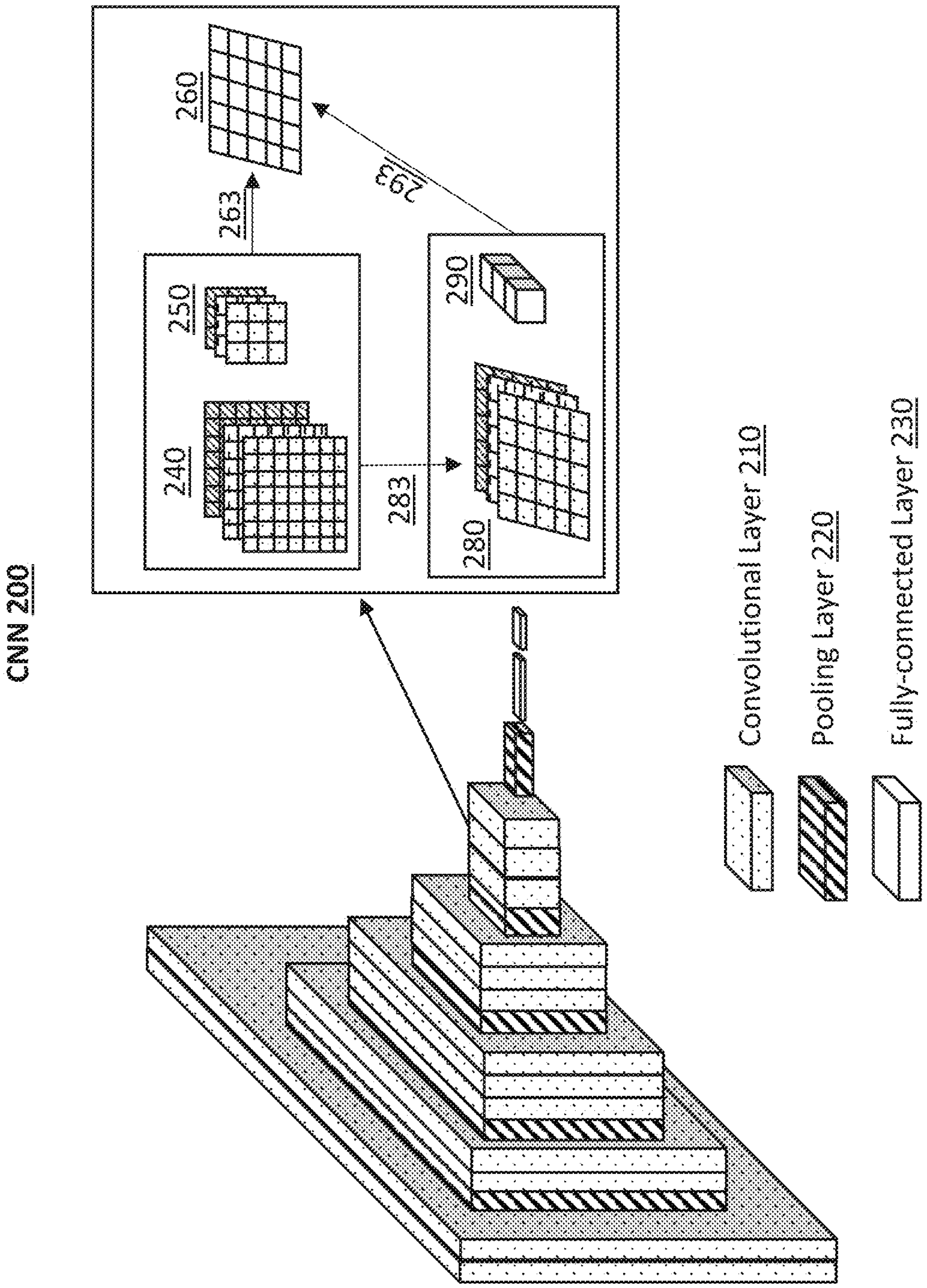
FIG. 2 illustrates an example convolutional neural network (CNN), in accordance with various embodiments.

FIG. 2 illustrates an example CNN 200, in accordance with various embodiments. The CNN 200 may be executed by a DNN accelerator, e.g., the DNN accelerator 302 in FIG. 3. For the purpose of illustration, the CNN 200 includes a sequence of layers comprising a plurality of convolutional layers 220 (individually referred to as "convolutional layer 220"), a plurality of pooling layers 220 (individually referred to as "pooling layer 220"), and a plurality of fully-connected layers 230 (individually referred to as "fully-connected layer 230"). In other embodiments, the CNN 200 may include fewer, more, or different layers. In an execution of the CNN 200, the layers of the CNN 200 execute tensor computation that includes many tensor operations, such as convolutions, interpolations, pooling operations, elementwise operations (e.g., elementwise addition, elementwise multiplication, etc.), other types of tensor operations, or some combination thereof.

The convolutional layers 220 summarize the presence of features in inputs to the CNN 200. The convolutional layers 220 function as feature extractors. The first layer of the CNN 200 is a convolutional layer 220. In an example, a convolutional layer 220 performs a convolution on an input tensor 240 (also referred to as IFM 240) and a filter 250. As shown in FIG. 2, the IFM 240 is represented by a 7×7×3 three-dimensional (3D) matrix. The IFM 240 includes 3 input channels, each of which is represented by a 7×7 two-dimensional (2D) matrix. The 7×7 2D matrix includes 7 input elements (also referred to as input points) in each row and 7 input elements in each column. The filter 250 is represented by a 3×3×3 3D matrix. The filter 250 includes 3 kernels, each of which may correspond to a different input channel of the IFM 240. A kernel is a 2D matrix of weights, where the weights are arranged in columns and rows. A kernel can be smaller than the IFM. In the embodiments of FIG. 2, each kernel is represented by a 3×3 2D matrix. The 3×3 kernel includes 3 weights in each row and 3 weights in each column. Weights can be initialized and updated by backpropagation using gradient descent. The magnitudes of the weights can indicate importance of the filter 250 in extracting features from the IFM 240.

The convolution includes multiply-accumulate (MAC) operations with the input elements in the IFM 240 and the weights in the filter 250. The convolution may be a standard convolution 263 or a depthwise convolution 283. In the standard convolution 263, the whole filter 250 slides across the IFM 240. All the input channels are combined to produce an output tensor 260 (also referred to as output feature map (OFM) 260). The OFM 260 is represented by a 5×5 2D matrix. The 5×5 2D matrix includes 5 output elements (also referred to as output points) in each row and 5 output elements in each column. For the purpose of illustration, the standard convolution includes one filter in the embodiments of FIG. 2. In embodiments where there are multiple filters, the standard convolution may produce multiple output channels (OCs) in the OFM 260.

The multiplication applied between a kernel-sized patch of the IFM 240 and a kernel may be a dot product. A dot product is the elementwise multiplication between the kernel-sized patch of the IFM 240 and the corresponding kernel, which is then summed, always resulting in a single value. Because it results in a single value, the operation is often referred to as the "scalar product." Using a kernel smaller than the IFM 240 is intentional as it allows the same kernel (set of weights) to be multiplied by the IFM 240 multiple times at different points on the IFM 240. Specifically, the kernel is applied systematically to each overlapping part or kernel-sized patch of the IFM 240, left to right, top to bottom. The result from multiplying the kernel with the IFM 240 one time is a single value. As the kernel is applied multiple times to the IFM 240, the multiplication result is a 2D matrix of output elements. As such, the 2D output matrix (i.e., the OFM 260) from the standard convolution 263 is referred to as an OFM.

In the depthwise convolution 283, the input channels are not combined. Rather, MAC operations are performed on an individual input channel and an individual kernel and produce an OC. As shown in FIG. 2, the depthwise convolution 283 produces a depthwise output tensor 280. The depthwise output tensor 280 is represented by a 5×5×3 3D matrix. The depthwise output tensor 280 includes 3 OCs, each of which is represented by a 5×5 2D matrix. The 5×5 2D matrix includes 5 output elements in each row and 5 output elements in each column. Each OC is a result of MAC operations of an input channel of the IFM 240 and a kernel of the filter 250. For instance, the first OC (patterned with dots) is a result of MAC operations of the first input channel (patterned with dots) and the first kernel (patterned with dots), the second OC (patterned with horizontal strips) is a result of MAC operations of the second input channel (patterned with horizontal strips) and the second kernel (patterned with horizontal strips), and the third OC (patterned with diagonal stripes) is a result of MAC operations of the third input channel (patterned with diagonal stripes) and the third kernel (patterned with diagonal stripes). In such a depthwise convolution, the number of input channels equals the number of OCs, and each OC corresponds to a different input channel. The input channels and output channels are referred to collectively as depthwise channels. After the depthwise convolution, a pointwise convolution 293 is then performed on the depthwise output tensor 280 and a 1×1×3 tensor 290 to produce the OFM 260.

The OFM 260 is then passed to the next layer in the sequence. In some embodiments, the OFM 260 is passed through an activation function. An example activation function is ReLU. ReLU is a calculation that returns the value provided as input directly, or the value zero if the input is zero or less. The convolutional layer 220 may receive several images as input and calculate the convolution of each of them with each of the kernels. This process can be repeated several times. For instance, the OFM 260 is passed to the subsequent convolutional layer 220 (i.e., the convolutional layer 220 following the convolutional layer 220 generating the OFM 260 in the sequence). The subsequent convolutional layers 220 perform a convolution on the OFM 260 with new kernels and generate a new feature map. The new feature map may also be normalized and resized. The new feature map can be kernelled again by a further subsequent convolutional layer 220, and so on.

In some embodiments, a convolutional layer 220 has four hyperparameters: the number of kernels, the size F kernels (e.g., a kernel is of dimensions F×F×D pixels), the S step with which the window corresponding to the kernel is dragged on the image (e.g., a step of one means moving the window one pixel at a time), and the zero-padding P (e.g., adding a black contour of P pixels thickness to the input image of the convolutional layer 220). The convolutional layers 220 may perform various types of convolutions, such as 2-dimensional convolution, dilated or atrous convolution, spatial separable convolution, depthwise separable convolution, transposed convolution, and so on. The CNN 200 includes 26 convolutional layers 220. In other embodiments, the CNN 200 may include a different number of convolutional layers.

The pooling layers 220 down-sample feature maps generated by the convolutional layers, e.g., by summarizing the presence of features in the patches of the feature maps. A pooling layer 220 is placed between two convolution layers 220: a preceding convolutional layer 220 (the convolution layer 220 preceding the pooling layer 220 in the sequence of layers) and a subsequent convolutional layer 220 (the convolution layer 220 subsequent to the pooling layer 220 in the sequence of layers). In some embodiments, a pooling layer 220 is added after a convolutional layer 220, e.g., after an activation function (e.g., ReLU, etc.) has been applied to the OFM 260.

A pooling layer 220 receives feature maps generated by the preceding convolution layer 220 and applies a pooling operation to the feature maps. The pooling operation reduces the size of the feature maps while preserving their important characteristics. Accordingly, the pooling operation improves the efficiency of the DNN and avoids over-learning. The pooling layers 220 may perform the pooling operation through average pooling (calculating the average value for each patch on the feature map), max pooling (calculating the maximum value for each patch of the feature map), or a combination of both. The size of the pooling operation is smaller than the size of the feature maps. In various embodiments, the pooling operation is 2×2 pixels applied with a stride of two pixels, so that the pooling operation reduces the size of a feature map by a factor of 2, e.g., the number of pixels or values in the feature map is reduced to one quarter the size. In an example, a pooling layer 220 applied to a feature map of 6×6 results in an output pooled feature map of 3×3. The output of the pooling layer 220 is inputted into the subsequent convolution layer 220 for further feature extraction. In some embodiments, the pooling layer 220 operates upon each feature map separately to create a new set of the same number of pooled feature maps.

The fully-connected layers 230 are the last layers of the DNN. The fully-connected layers 230 may be convolutional or not. The fully-connected layers 230 receive an input operand. The input operand defines the output of the convolutional layers 220 and pooling layers 220 and includes the values of the last feature map generated by the last pooling layer 220 in the sequence. The fully-connected layers 230 apply a linear combination and an activation function to the input operand and generate a vector. The vector may contain as many elements as there are classes: element i represents the probability that the image belongs to class i. Each element is therefore between 0 and 1, and the sum of all is worth one. These probabilities are calculated by the last fully-connected layer 230 by using a logistic function (binary classification) or a SoftMax function (multi-class classification) as an activation function. In some embodiments, the fully-connected layers 230 multiply each input element by weight, make the sum, and then apply an activation function (e.g., logistic if N=2, SoftMax if N>2). This is equivalent to multiplying the input operand by the matrix containing the weights.

Figure 3:
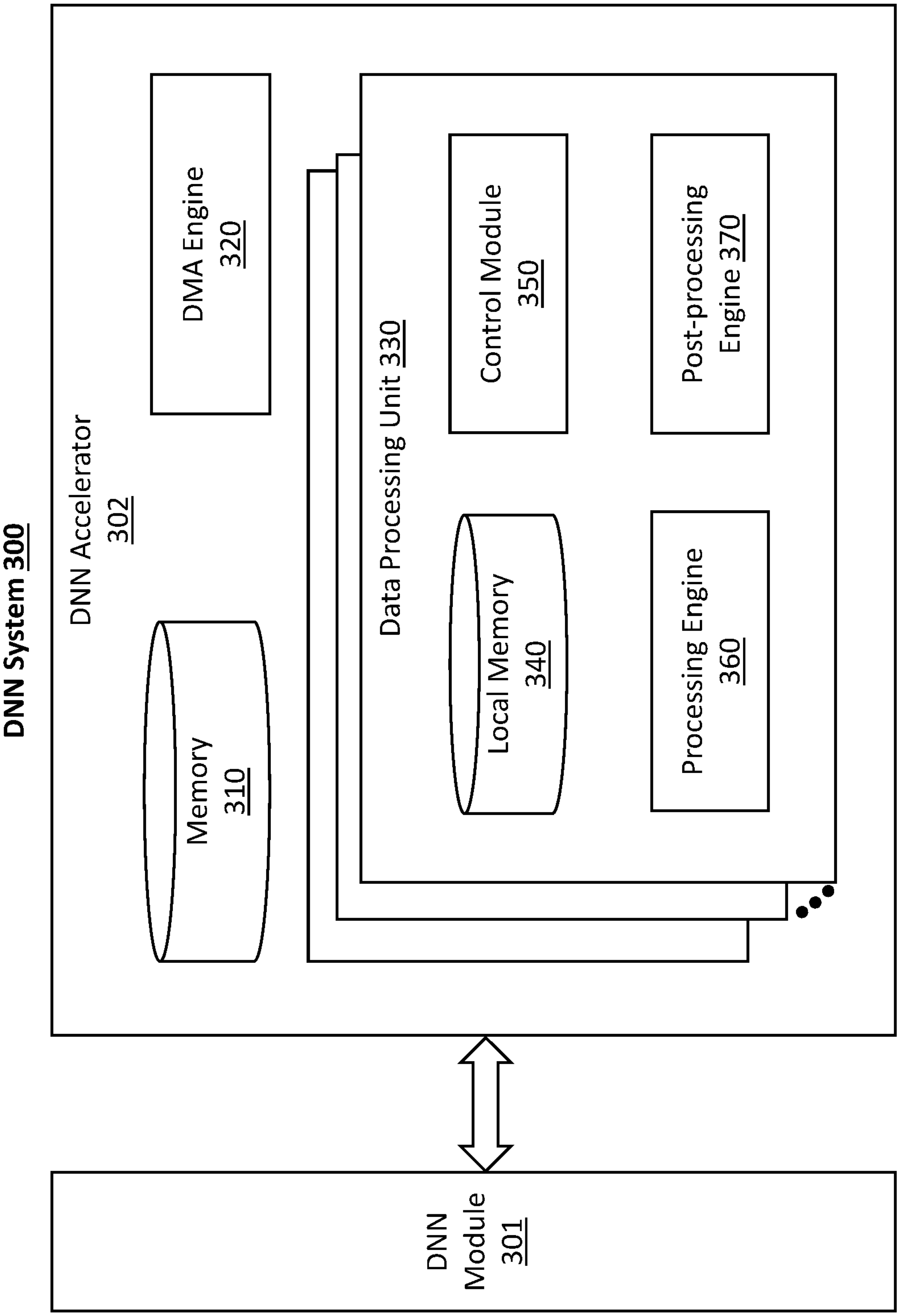
FIG. 3 is a block diagram of a DNN accelerator, in accordance with various embodiments.

FIG. 3 is a block diagram of a DNN system 300, in accordance with various embodiments. The whole DNN system 300 or a part of the DNN system 300 may be implemented in one or more computing devices, such as the computing device 2000 in FIG. 12. The DNN system 300 can generate and execute DNNs. As shown in FIG. 3, the DNN system 300 includes a DNN module 301 and a DNN accelerator 302. In other embodiments, alternative configurations, different or additional components may be included in the DNN system 300. For instance, the DNN system 300 may include multiple DNN modules or multiple DNN accelerators. Further, functionality attributed to a component of the DNN system 300 may be accomplished by a different component included in the DNN system 300 or a different system. In some embodiments, the DNN module 301 and DNN accelerator 302 may include different types of processing units. In an example, the DNN module 301 may be implemented by one or more central processing units (CPUs). The DNN accelerator 302 may also be referred to as an AI accelerator or an AI processor. The DNN module 301 and DNN accelerator 302 may be implemented in the same chip or separate chips.

The DNN module 301 facilitates generation and deployment of DNNs. In some embodiments, the DNN module 301 may generate and train DNNs. For instance, the DNN module 301 can define the layered architecture of a DNN. The DNN module 301 can also determine the internal parameters of the DNN through a DNN training process. The DNN module 301 may also determine one or more hyperparameters that define how the DNN is trained. An example hyperparameter is a sparsity ratio that defines the sparsity level of one or more deep learning tensors for the DNN. The DNN module 301 may also compress DNNs, e.g., during or after training. In some embodiments, the DNN module 301 may prune internal parameters (e.g., weights) of one or more layers of a DNN by changing nonzero parameters to zeros. The DNN module 301 may prune internal parameters based on a target sparsity ratio. A sparsity ratio may be the ratio of the number of zero parameters to the total number of parameters. In an example where the DNN module 301 prunes parameters during DNN training, the DNN module 301 may prune parameters of a layer to achieve a target sparsity ratio after one or more epochs. The DNN module 301 may prevent the pruned parameters from changing values during the rest of the training process. Alternatively, the DNN module 301 may allow the pruned parameters to change values so that a pruned, zero parameter may have a nonzero value after further training. The DNN module 301 may prune parameters of the layer again after one or more additional epochs.

The DNN module 301 may deploy trained, compressed, or validated DNNs for use in neural network applications. In some embodiments, the DNN module 301 may distribute trained, compressed, or validated DNNs to devices or systems which may use the DNNs to perform tasks (e.g., image classification, motion planning, etc.) for which the DNNs were trained. In other embodiments, the DNN module 301 may facilitate deployment of the DNNs using the DNN accelerator 302. For instance, the DNN module 301 may receive data from a device or system coupled with the DNN system 300 and input the received data (or data generated by the DNN module 301, e.g., based on the received data) into a DNN. The DNN module 301 may generate instructions (e.g., computer program instructions) that can be executed by the DNN accelerator 302 for DNN execution. The DNN module 301 may receive an output of the DNN from the DNN accelerator 302. The DNN module 301 may transmit the output of the DNN (or a result of processing the output of the DNN by the DNN module 301) to the device or system. In some embodiments, the DNN module 301 may control execution processes of trained, compressed, or validated DNNs. The DNN module 301 may function as a complier for DNNs executed by the DNN accelerator 302. The DNN module 301 may perform compilation of DNNs and generate compilation descriptors, based on which the DNNs may be executed.

The DNN module 301 may compress neural network operations to optimize or improve the performance of the DNN accelerator 302. For instance, the DNN module 301 may modify internal parameters of a neural network operation to reduce the memory and compute requirements for carrying out the neural network operation. In an example, the DNN module 301 may compress a weight tensor of the neural network operation on a block level and may use different compression ratios for different blocks while ensuring subblocks within the same block have the same compression ratio. Through the compression, the DNN module 301 may obtain a compressed weight tensor that has mixed formats. In an example, some weights may not be modified and have the original precision, while other weights may be modified to have a lower precision. A weight with the lower precision may have less bits and therefore, would requires less storage and compute resources. In another example, some weights may not be modified and have their original values, while other weights may be modified to have a value of zero. The zero weights may be skipped from storing in memory or being used in computations. The DNN module DNN module 301 may provide the compressed weight tensor to the DNN accelerator 302, and the latter may carry out the neural network operation using the compressed weight tensor.

The DNN accelerator 302 executes DNNs provided by the DNN module 301. For instance, the DNN accelerator 302 can execute a DNN by carrying out neural network operations in the DNN. The process of carrying out a neural network operation is also referred to as a process of executing the neural network operation or performing the neural network operation. The execution of the DNN may be for training the DNN or for using the DNN to perform AI tasks. As shown in FIG. 3, the DNN accelerator 302 includes a memory 310, a DMA engine 320, and DPUs 330 (individually referred to as "DPU 330"). In other embodiments, alternative configurations, different or additional components may be included in the DNN accelerator 302. For example, the DNN accelerator 302 may include more than one memory 310 or DMA engine 320. As another example, the DNN accelerator 302 may include a single DPU 330. Further, functionality attributed to a component of the DNN accelerator 302 may be accomplished by a different component included in the DNN accelerator 302 or by a different system. A component of the DNN accelerator 302 may be implemented in hardware, software, firmware, or some combination thereof.

The memory 310 stores data associated with neural network operations performed by the DNN accelerator 302. In some embodiments, the memory 310 may store data to be used by the DPUs 330 for executing neural network operations. The memory 310 may store input activations. The memory 310 may also store weights, such as weights in kernels of convolutions, which are determined by training DNNs. In some embodiments, the memory 310 may store weights having mixed formats. The memory 310 may further store outputs of neural network operations, such as output activations. In some embodiments, the memory 310 includes one or more dynamic random-access memories (DRAMs). In some embodiments (e.g., embodiments in which the memory 310 is implemented on a different chip from the DPUs 330), the memory 310 may function as an off-chip memory from the perspective of the DPUs 330.

The DMA engine 320 facilitates data transfer between the memory 310 and local memories of the DPUs 330. For example, the DMA engine 320 can read data from the memory 310 and write data into a local memory of a DPU 330. As another example, the DMA engine 320 can read data from a local memory of a DPU 330 and write data into the memory 310. For instance, the DMA engine 320 may read input activations and weights of convolution from the memory 310 and load the input activations and weights to one or more DPUs 330. The DMA engine 320 may also write output activations of convolutions computed by one or more DPUs 330 to the memory 310. The DMA engine 320 provides a DMA feature that allows the DPU 330 to initiate data transfer between the memory 310 and the local memories of the DPUs 330 and to perform other operations while the data transfer is being conducted. In some embodiments, the DMA engine 320 may read tensors from the memory 310, modify the tensors in a way that is optimized for the DPU 330 before it writes the tensors into the local memories of the DPUs 330.

The DPUs 330 perform neural network operations in DNNs. For instance, a DPU 330 may execute a DNN layer by running one or more deep learning operations in the DNN layer. A DPU 330 may execute a layer, or a portion of a layer, at a time. In some embodiments, the operations of the DNN layers may be run by multiple DPUs 330 in parallel. For instance, multiple DPUs 330 may each perform a portion of a workload for a neural network operation. Data may be shared between the DPUs 330. A DPU 330 may also be referred to as a neural processing unit, a compute block, or a compute tile.

The DPUs 330 may be capable of running various types of neural network operations, such as convolution (including depthwise convolutions), layer normalization, SoftMax operation, pooling, elementwise operation, linear operation, nonlinear operation, and so on. N=Neural network operations performed by the DPUs 330 include tensor operations, i.e., operations whose inputs are tensors or operations whose outputs are tensors. In an example, the DPU 330 receives an input tensor and one or more convolutional kernels and performs a convolution with the input tensor and convolutional kernels. The result of the convolution may be an output tensor, which can be further computed, e.g., by the DPU 330 or another DPU 330.

In the embodiments of FIG. 3, each DPU 330 includes a local memory 340, a control module 350, a processing engine 360, and a post-processing engine 370. The processing engine 360 and post-processing engine 370 may constitute a compute engine of the DPU 330. Some or all the components of the DPU 330 can be implemented on the same chip. In other embodiments, alternative configurations, different or additional components may be included in the DPU 330. Further, functionality attributed to a component of the DPU 330 may be accomplished by a different component included in the DPU 330, a different DPU 330, another component of the DNN accelerator 302, or a different system. A component of the DPU 330 may be implemented in hardware, software, firmware, or some combination thereof.

The local memory 340 is local to the corresponding DPU 330. In the embodiments of FIG. 3, the local memory 340 is inside the DPU 330. In other embodiments, the local memory 340 may be outside the DPU 330. Data in the local memory 340 may be transferred to or from the memory 310, e.g., through the DMA engine 320. In some embodiments, data in the local memory 340 may be transferred to or from the local memory of another DPU 330. The local memory 340 may store data received, used, or generated by the control module 350, the processing engine 360, or the post-processing engine 370. Examples of the data may include input activations, weights, output activations, sparsity bitmaps, keys, values, and so on.

In some embodiments, the local memory 340 may store tensors to be processed by the processing engine 360 or the post-processing engine 370. The tensors may be input tensors of deep learning operations. The local memory 340 may store weights of mixed weights. The local memory 340 may also store tensors generated by the processing engine 360 or the post-processing engine 370. The tensors may be output tensors of deep learning operations. The layout of data points of a tensor in the local memory 340 may depend on the format in which the tensor is stored. In some embodiments, the local memory 340 may store tensors in various formats, including Z-major (e.g., ZXY or ZYX) format, X-major (e.g., XYZ or XZY) format, and Y-major (e.g., YXZ or YZX) format. For a tensor with Z-major format, the local memory 340 may store data points having the same (x, y) coordinate contiguously. For instance, the data points having the same (x, y) coordinate may be stored at a sequence of memory addresses in the local memory 340. For a tensor with the ZXY format or ZYX format, the local memory 340 may store data points having the same (x, y) coordinate contiguously. For instance, the data points having the same (x, y) coordinate may be stored at a sequence of memory addresses in the local memory 340. For a tensor with X-major format, the local memory 340 may store data points having the same (y, z) coordinate contiguously. For a tensor with Y-major format, the local memory 340 may store data points having the same (x, z) coordinate contiguously.

In some embodiments, the local memory 340 includes one or more SRAMs. The local memory 340 may be byte-addressable, and each memory address identifies a single byte (eight bits) of storage. In some embodiments, the local memory 340 may include memory banks (e.g., SRAM banks). The number of memory banks in the local memory 340 may be 16, 64, 128, 356, 512, 1024, 2048, or other numbers. A memory bank may include a plurality of storage units. In an example, a memory bank may include 8, 16, 64, or a different number of storage units. A memory bank or a storage unit in a memory bank may have a memory address. In an example, a storage unit may store a single byte, and data larger than a single byte may be stored in storage units with consecutive memory addresses, i.e., adjacent storage units. For instance, a storage unit can store an integer number in the INT8 format, versus two storage units may be needed to store a number in the FP16 or BF16 format, which has 16 bits. In some embodiments, 16 bits can be transferred from the local memory 340 in a single read cycle. In other embodiments, 16 bits can be transferred from the local memory 340 in multiple read cycles, such as two cycles.

In some embodiments, the local memory 340 has a two-tier (or two-level) topology, where the memory banks are grouped into a plurality of bank groups. The memory banks may be grouped in a manner that avoids two or more consecutive requests from being sent to the same bank group to improve the bandwidth utilization. Each bank group may include a different subset of the memory banks. The bank group tier has a group selection module that is coupled to all the bank groups through an interconnect. The interconnect may include one or more fabrics with a predetermined or fixed bandwidth. The group selection module may also be coupled to one or more data ports through the interconnect or another interconnect. The data ports may be used by other components of the DPU 330 (e.g., the control module 350, processing engine 360, or post-processing engine 370) to access the local memory 340. The bank tier has a bank selection module within each bank group. The bank selection module is coupled to the group selection module through interconnects. Each bank group may include interconnects that facilitate data transfer between the bank selection module, arbiters, CDC buffers, and memory banks. Each memory bank may have its own arbiter and CDC buffers. The CDC buffers are used to temporarily store data as the local memory 340 has different clock domains. The CDC buffers may be arranged between two different clock domains. For instance, the data ports, group selection module, bank selection modules, and arbiters may be in one or more faster clock domains, while the memory banks are in a slower clock domain. The data ports, group selection module, bank selection modules, or arbiters may operate in accordance with faster clock cycles than the memory banks.

Data transfer requests may be pushed into the group selection module from one or more data ports. The group selection module may process a data transfer request beforehand to select which bank group/interconnect to push the data transfer request into. The group selection module may select a bank group/interconnect based on the memory address in the data transfer request. The data transfer request may then be pushed to the selected bank group or through the selected interconnect. The bank selection module may process a data transfer request beforehand to select which memory bank/interconnect to push the data transfer request into, e.g., based on the memory address in the data transfer request. The data transfer request may then be pushed to the arbiter coupled to the selected memory bank and further to a CDC buffer coupled to the selected memory bank. The data transfer request may be temporarily stored in the CDC buffer before it is pushed to the selected memory bank where data may either be written into the selected memory bank or read from the selected memory bank to complete the data transfer.

After the data is written or read, the selected memory bank may generate a response to the data transfer request. In embodiments where the request is for date write, the response may indicate a confirmation that the data has been written. In embodiments where the request is for date read, the response may include the data itself. The response may be temporarily stored in another CDC buffer coupled to the memory bank before it is pushed to the arbiter of the memory bank. The response may be further sent to the bank selection module from the arbiter through an interconnect of the memory bank, then sent to the group selection module, from which the response may be provided to one or more data ports. More details regarding two-level topology of local memories are provided below in conjunction with FIGS. 4-7.

The control module 350 controls data transfer between the local memory 340 and the processing engine 360 or between the local memory 340 and the post-processing engine 370. The control module 350 may load data (e.g., input activations, weights, etc.) from the local memory 340 into the processing engine 360 or post-processing engine 370. The control module 350 may also drain data (e.g., output activations, etc.) from the processing engine 360 or post-processing engine 370 into the local memory 340. In some embodiments, the control module 350 may transfer data from the local memory 340 into one or more storage units in the processing engine 360 or post-processing engine 370. A storage unit in the processing engine 360 or post-processing engine 370 may include one or more register files for storing data to be used for computations in deep learning operations. The control module 350 can transfer data generated by the processing engine 360 or post-processing engine 370 into the local memory 340. The data may be results of deep learning operations performed by the processing engine 360 or post-processing engine 370.

In some embodiments, the control module 350 may generate data transfer requests or manage the generation of data transfer requests by the processing engine 360 or post-processing engine 370. A data transfer request may be a read request to read data from the local memory 340, such as data that the processing engine 360 or post-processing engine 370 will use to perform a deep learning operation. Additionally or alternatively, a data transfer request may be a write request to write data computed by the processing engine 360 or post-processing engine 370 into the local memory 340. The control module 350 may also facilitate transmission of response to data transfer requests from the local memory 340 to the processing engine 360 or post-processing engine 370. In some embodiments, the control module 350 may facilitate transmission of data transfer requests to data ports associated with the local memory 340.

In some embodiments, the control module 350 may manage clock cycles associated with data transfer. For instance, the control module 350 may facilitate a faster clock domain for the generation of the data transfer requests or the transmission of the data transfer requests via one or more data port. A data port (also referred to as "port," "host port," or "PE port") may be associated with one or more PEs in the processing engine 360 or post-processing engine 370. Also, a PE may be associated with one or more ports. The control module 350 may further facilitate a slower clock domain in the local memory 340. The slower clock domain may include the memory banks in the local memory 340.

The processing engine 360 performs operations in DNNs. The processing engine 360 may include one or more processing cells. In some embodiments, the processing cells may be arranged in one or more rows and one or more columns in the processing engine 360. Each processing cell may include PEs that may be arranged in an array that includes rows and columns. All the PEs in the processing engine 360 may constitute a bigger array that includes more rows and columns. An example PE may be or may include one or more MAC units that can perform MAC operations. In some embodiments (e.g., embodiments where the DPU 330 executes a convolutional layer), a computation in an MAC unit may be an MAC operation on an activation operand and a weight operand. The activation operand may be an activation tensor that may include one or more activations in the input tensor of the convolution. Different activations may be in different input channels. The weight operand may be a weight tensor that may include one or more weights in the filter of the convolution. The values of the weights are determined through training the DNN or compressing the neural network operation after training. The weights in the weight operand may be in different input channels. In some embodiments, the activation operand or weight operand is a vector along the input channel (IC) dimension.

In some embodiments, an MAC unit includes one or more multipliers for performing multiplications. An MAC unit may also include one or more accumulators ("adders") for performing accumulations. A column of MAC units is referred to as an MAC column. An MAC column may be associated with one or more MAC lanes. A MAC lane is a path for loading data e.g., by the control module 350, into an MAC column. A MAC lane may be also referred to as a data transmission lane or data loading lane. An MAC column may have multiple MAC lanes. The loading bandwidth of the MAC column is an aggregation of the loading bandwidths of all the MAC lanes associated with the MAC column. With a certain number of MAC lanes, data can be fed into the same number of independent MAC units simultaneously. In some embodiments where an MAC column has four MAC lanes for feeding activations or weights into the MAC column and each MAC lane may have a bandwidth of 16 bytes, the four MAC lanes can have a total loading bandwidth of 64 bytes.

In some embodiments, the processing engine 360 may be capable of depthwise convolution, standard convolution, or both. In a depthwise convolution, an MAC unit may perform an MAC operation that includes a sequence of multiplications for an input operand and a weight operand. Each multiplication in the sequence (also referred to as a cycle) is a multiplication of a different activation in the input operand with a different weight in the weight operand. The activation and weight in the same cycle may correspond to the same channel. The sequence of multiplication produces a product operand that includes a sequence of products. The MAC operation may also include accumulations in which multiple product operands are accumulated to produce an output operand of the MAC unit. The processing engine 360 may output multiple output operands at a time, each of which is generated by a different MAC unit. In a standard convolution, MAC operations may include accumulations across the channels. For instance, as opposed to generating an output operand, a MAC unit may accumulate products across different channels to generate a single output point.

In some embodiments, the processing engine 360 may include acceleration logic for accelerating neural network operations. For instance, each processing cell in the processing engine 360 may include one or more acceleration modules. In an example, each MAC column or each MAC row may have a corresponding acceleration module that accelerates MAC operations in the MAC column or MAC row. In some embodiments, an acceleration module accelerates computations in the processing engine 360 based on sparsity in input data. The acceleration module may include a storage unit that stores a sparsity map (e.g., a sparsity bitmap), which may be loaded to the storage unit by the control module 350. The sparsity map may indicate the sparsity pattern of a weight block and shows the positions of zero data elements and positions of nonzero data elements in a tensor, such as an input activation tensor or weight tensor.

Taking a weight tensor for example, a sparsity map of the weight tensor may have the same number of elements as the weight block and these elements are arranged in a data structure having the same shape as the weight tensor. An element in the sparsity map may indicate whether the corresponding element (i.e., weight) in the weight tensor is zero or not. For instance, a zero element in the sparsity map may indicate that the corresponding weight is zero, while a one-valued element in the sparsity map may indicate that the corresponding weight is nonzero. The acceleration module may use the sparsity map to identify activations and weights to be used in MAC operations by the MAC units and to transfer the identified activations and weights to the storage units (e.g., register files) of the MAC units. The other activations and weights may be skipped from computation to accelerate the neural network operation.

The post-processing engine 370 also performs computations in neural network operations. In some embodiments, the post-processing engine 370 processes outputs of the processing engine 360. The post-processing engine 370 may include one or more post-PEs. In some embodiments, the post-PEs in the post-processing engine 370 may be arranged in an array that has rows and columns. In some embodiments, the post-processing engine 370 computes activation functions. The post-processing engine 370 may receive outputs of the processing engine 360 as inputs to the activation functions. In addition or alternative to activation functions, the post-processing engine 370 may perform other types of post processing on outputs of the processing engine 360. For instance, the post-processing engine 370 may apply a bias on an output of the processing engine 360. In some embodiments, the post-processing engine 370 may be bypassed for certain neural network operations.

Figure 4:
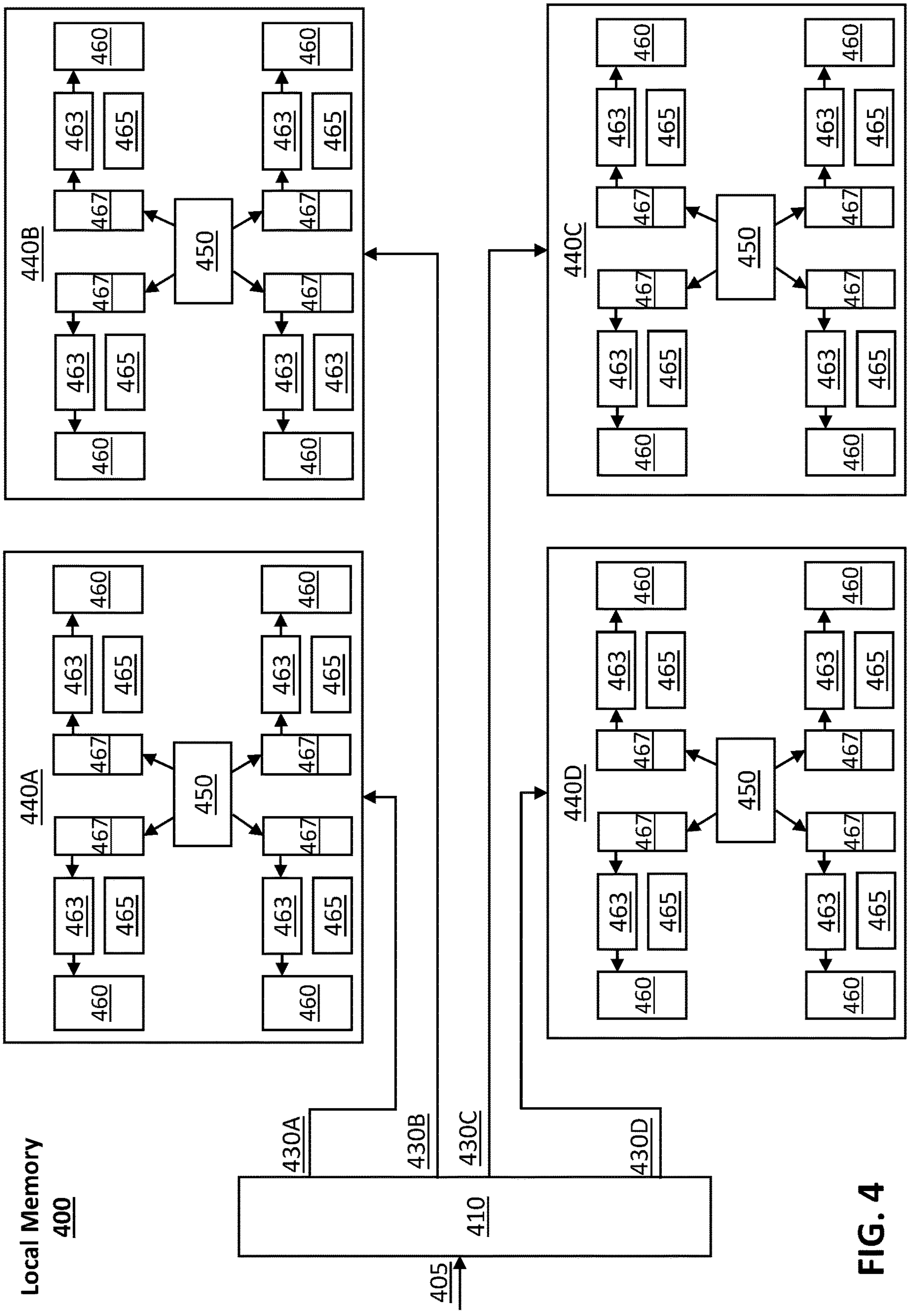
FIG. 4 illustrates a request path in a local memory, in accordance with various embodiments.

FIG. 4 illustrates an example request path in a local memory 400, in accordance with various embodiments. The local memory 400 may be a SRAM. The local memory 400 may be an embodiment of the local memory 340 in FIG. 3. In the embodiments of FIG. 4, the local memory 400 includes a group selection module 410, four interconnects 430A-430D (collectively referred to as "interconnects 430" or "interconnect 430"), and four bank groups 440A-440D ((collectively referred to as "bank groups 440" or "bank group 440"). In other embodiments, the local memory 400 may include different, fewer, or more components. For instance, the local memory 400 may include a different number of interconnects or bank groups.

The group selection module 410 is coupled to a host port 405. The host port 405 may be a port of a PE array (e.g., the processing engine 360 or post-processing engine 370 in FIG. 3) for communicating with the local memory 400. The port may be used by one or more PEs in the PE array to make data transfer requests with the local memory 400. The request path may start when the group selection module 410 receives one or more data transfer requests from the host port 405. A data transfer request may be a read request for reading data from the local memory 400 or a write request for writing data into the local memory 400. In some embodiments, a data transfer request includes a memory address which may point to a particular bank in the local memory 400. Even though FIG. 4 shows a single host port 405, the local memory 400 may be associated with more than one host port in other embodiments. The group selection module 410 may receive data transfer requests from multiple host ports in parallel.

The group selection module 410 may select which bank groups 440 the data transfer requests are to be transported to. In some embodiments, the group selection module 410 may include one or more demultiplexers that can be used to select bank groups 440. The group selection module 410 is coupled to the bank groups 440 through the interconnects 430. For instance, the interconnect 430A connects the group selection module 410 to the bank group 440A, the interconnect 430B connects the group selection module 410 to the bank group 440B, the interconnect 430C connects the group selection module 410 to the bank group 440C, and the interconnect 430D connects the group selection module 410 to the bank group 440D. An interconnect 430 may provide a data transfer path and may be a fabric with a predetermined or fixed bandwidth. For instance, the maximum number of bytes transferred through an interconnect 430 at a time may be a predetermined or fixed number.

Each bank group 440 includes a bank selection module 450, four banks 460 (individually referred to as "bank 460"), four CDC buffers 463 (individually referred to as "CDC buffer 463"), additional four CDC buffers 465 (individually referred to as "CDC buffer 465"), and four arbiters 467 (individually referred to as "arbiter 467"). Each CDC buffer 463, CDC buffer 465, and arbiter 467 are specific to a particular bank 460. The CDC buffer 463, CDC buffer 465, arbiter 467, and the corresponding bank 460 may be coupled through interconnects inside the bank group 440. In some embodiments, the CDC buffer 463 of a bank 460 may be configured to store data transfer request to be sent to the bank 460. The CDC buffer 465 of a bank 460 may be configured to store responses to data transfer requests that have been sent to and completed by the bank 460. The arbiter 467 of a bank 460 may arbitrate between multiple requests for access to the bank 460. The arbiter 467 may receive multiple requests, e.g., from the bank selection module 450, for access to the bank 460 and then schedule these requests, e.g., by determining the order in which requests should be granted. The arbiter 467 of a bank 460 may arbitrate between multiple responses from the bank 460 for access to the bank selection module 450. For instance, the arbiter 467 may receive multiple responses from the bank 460 and schedule these responses, e.g., by determining the order in which the responses should be pushed to the bank selection module 450.

In the embodiments of FIG. 4, the group selection module 410 receives one or more data transfer requests through the host port 405. After receiving a data transfer request, the group selection module 410 may select a bank group 440 and send at least part of the data transfer request to the bank group 440 through the corresponding interconnect 430. The memory address of the data transfer request may be decoded by the group selection module 410 or the bank selection module 450 in the bank group 440. After receiving at least part of the data transfer, the bank selection module 450 may select a bank 460 in the bank group 440, e.g., based on the memory address, and direct at least part of the data transfer request to the arbiter 467 of the bank 460. The arbiter 467 may schedule and facilitate temporarily storing at least part of the data transfer request into the CDC buffer 463 of the arbiter 467. The data transfer request may then be sent to the bank 460 from the CDC buffer 462 and can be completed by reading data stored in the bank 460 or writing new data into the bank 460. Different bank groups 440 or banks 460 may receive data transfer responses at different times.

Figure 5:
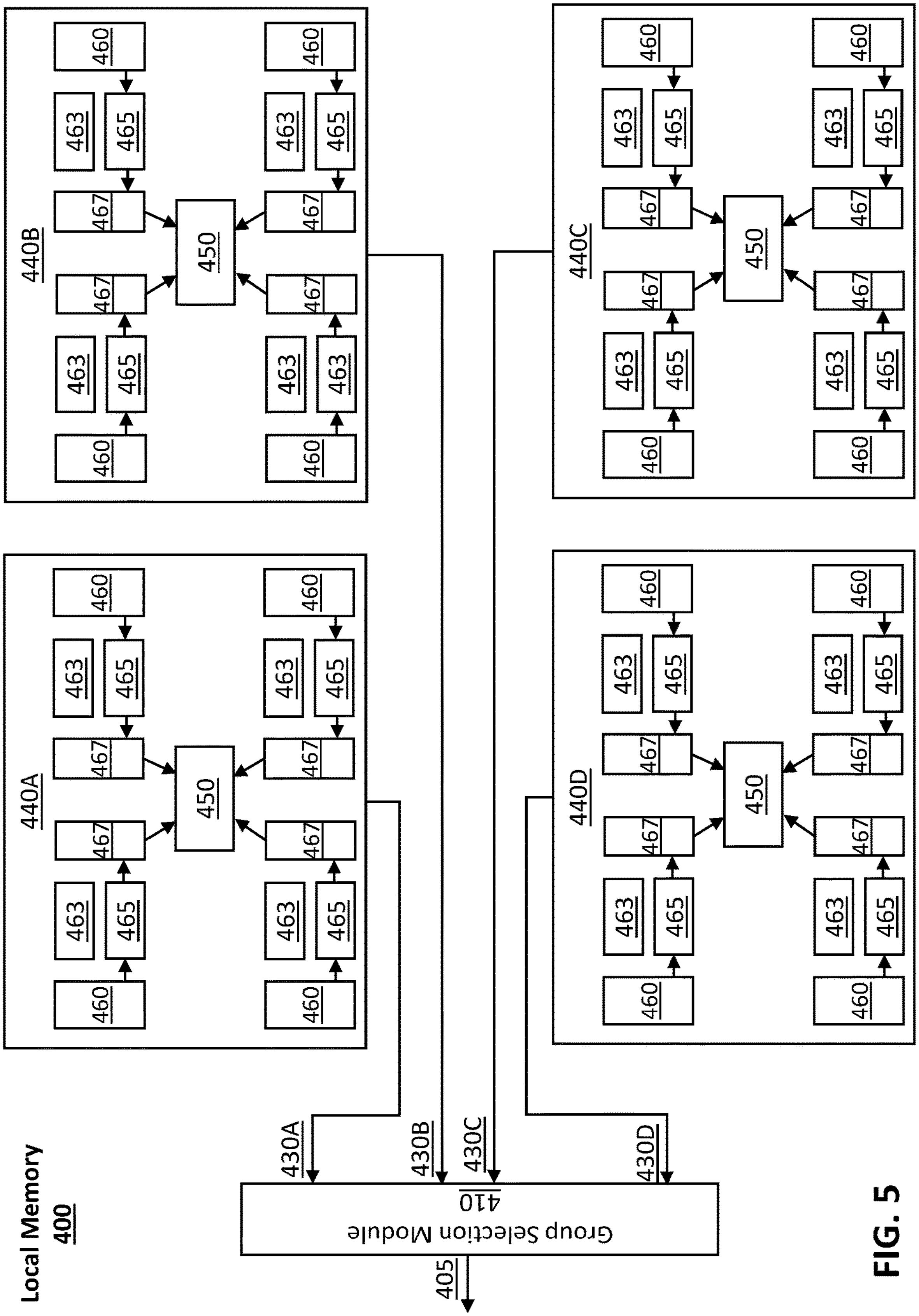
FIG. 5 illustrates a response path in the local memory, in accordance with various embodiments.

FIG. 5 illustrates an example response path in the local memory 400, in accordance with various embodiments. The response path may start when one or more banks 460 provide responses to data transfer requests. A response to a data transfer request may include information indicating whether the data transfer request has been completed (e.g., data has been read from or written into a bank 460) or failed (e.g., data could not be read from or written into a bank 460). A bank 460 may transmit a response to the CDC buffer 465 of the bank 460, where the response may be temporarily stored till it is sent to the arbiter 467 of the bank 460. In some embodiments, the arbiter 467 may arbitrate multiple responses from the bank 460. The arbiter 467 can schedule these responses, e.g., by determining the order in which the responses should be processed or transmitted to the bank selection module 450 in the bank group 440. A response may be then transmitted from the bank selection module 450 to the group selection module 410 through the corresponding interconnect 430. The responses may be further transmitted from the group selection module 410 to the host port 405 from which the response may be accessed by the PE array or a control module (e.g., the control module 350 in FIG. 3) associated with the PE array. The response path for a data transfer request may end after the host port 405 receives the response indicating that the data transfer request has been completed or failed. Different banks 460 may send out responses at different times.

The local memory 400 may have multiple clock domains. In some embodiments, the group selection module 410 and the host port 405 may be in the same clock domain. The clock domain may also include the interconnects 430, bank selection modules 450, or arbiters 467. All the components in the same clock domain may be driven by the same clock. The banks 460 may be in a different clock domain and driven by a different clock. The clock domain of the banks 460 may be slower (i.e., lower clock speed) than that of the group selection module 410 and the host port 405. In an example, a ratio of the clock speeds (also referred to as "clock rate") of the two clock domains may be 2:1. The CDC buffers 463 and 465 can support crossing from the faster clock domain to the slower clock domain. Each CDC buffer 463 or CDC buffer 465 may be a CDC FIFO buffer.

As shown in FIGS. 4 and 5, each bank group 440 has four data paths. Along each data path, a CDC buffer 463 and a CDC buffer 465 are arranged between the corresponding bank 460 and the corresponding arbiter 467. Even though FIGS. 4 and 5 show that the local memory 400 has four bank groups 440 and 16 banks 460, the local memory 400 may include a different number of banks 460 that are arranged in a different number of bank groups 440 or arranged in the same number of bank groups 440 in a different way.

Figure 6:
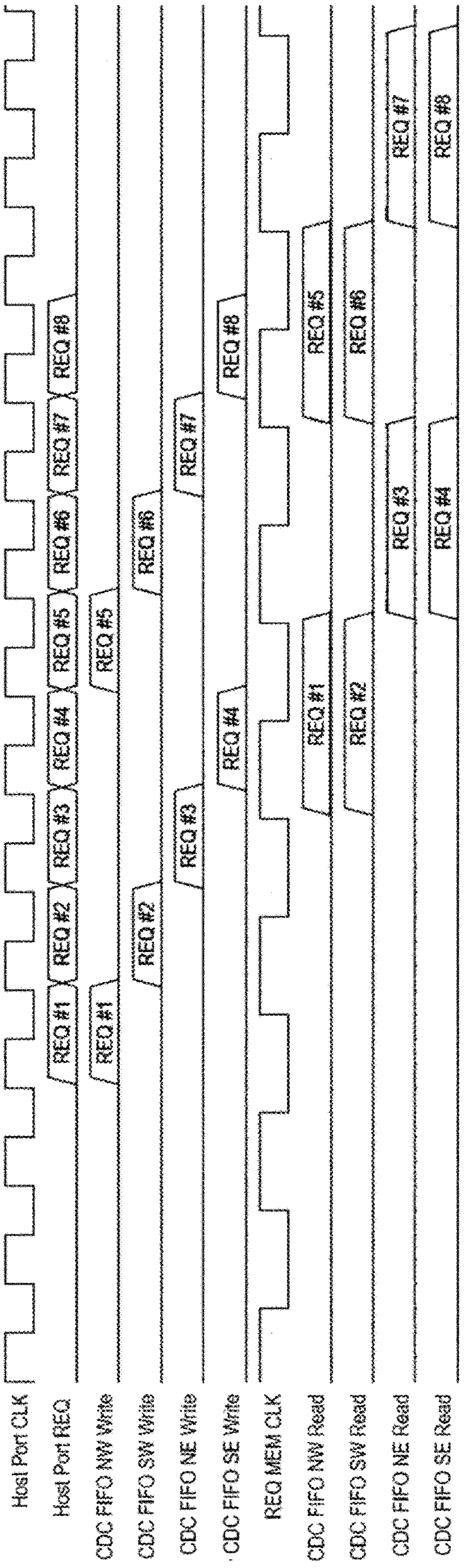
FIG. 6 illustrates clock cycles for a request path response path in a local memory, in accordance with various embodiments.

FIG. 6 illustrates clock cycles for a request path in a local memory, in accordance with various embodiments. The local memory in the embodiments of FIG. 6 may be an embodiment of the local memory 400 of FIG. 4. The request path may be an embodiment of the request path described above in conjunction with FIG. 4. There are two clock domains in the embodiments of FIG. 6: the first clock domain is represented by the clock for the host port (shown as "Host Port CLK" in FIG. 6), and the second clock domain is represented by the clock of the memory banks (shown as "REQ MEM CLK" in FIG. 6). The first clock domain has a higher frequency and is faster than the second clock domain. In other embodiments, there may be more than two clock domains.

The host port is in the first clock domain. In the embodiments of FIG. 6, the host port receives eight requests (REQ #1 through REQ #8). Each request is received by the host port in a single clock cycle. Next, the eight requests are written into four CDC FIFO buffers. Each CDC FIFO buffer may be an embodiment of the CDC buffers 463 in FIG. 4. The eight requests are written in eight consecutive clock cycles in the first clock domain. The first request (REQ #1) and the fifth request (REQ #5) are written into a first CDC FIFO buffer ("CDC FIFO NW" in FIG. 6) in the first and fifth clock cycles of the eight clock cycles. The second request (REQ #2) and the fifth request (REQ #6) are written into a second CDC FIFO buffer ("CDC FIFO SW" in FIG. 6) in the second and sixth clock cycles of the eight clock cycles. The third request (REQ #3) and the seventh request (REQ #7) are written into a third CDC FIFO buffer ("CDC FIFO NE" in FIG. 6) in the third and seventh clock cycles of the eight clock cycles. The fourth request (REQ #4) and the eighth request (REQ #8) are written into a fourth CDC FIFO buffer ("CDC FIFO SE" in FIG. 6) in the fourth and eighth clock cycles of the eight clock cycles.

Reading the requests from the CDC FIFO buffers follows the clock cycles of the slower clock domain. Four clock cycles are used for reading the eight requests from the CDC FIFO buffers. As shown in FIG. 6, the first request (REQ #1) and the fifth request (REQ #5) are read from the first CDC FIFO buffer ("CDC FIFO NW" in FIG. 6) in the first and third clock cycles of the four clock cycles. The second request (REQ #2) and the fifth request (REQ #6) are read from the second CDC FIFO buffer ("CDC FIFO SW" in FIG. 6) in the first and third clock cycles of the four clock cycles. The third request (REQ #3) and the seventh request (REQ #7) are read from the third CDC FIFO buffer ("CDC FIFO NE" in FIG. 6) in the second and fourth clock cycles of the four clock cycles. The fourth request (REQ #4) and the eighth request (REQ #8) are read from the fourth CDC FIFO buffer ("CDC FIFO SE" in FIG. 6) in the second and fourth clock cycles of the four clock cycles.

With the multiple CDC FIFO buffers, the bandwidth utilization can reach 100% in the embodiments of FIG. 6. As described above, consecutive requests can be pushed and pulled into different bank groups that are coupled to the different CDC FIFO buffers. The multi-bank group design of the local memory can avoid scenarios where CDC FIFO becomes full, and backpressure the host port.

Figure 7:
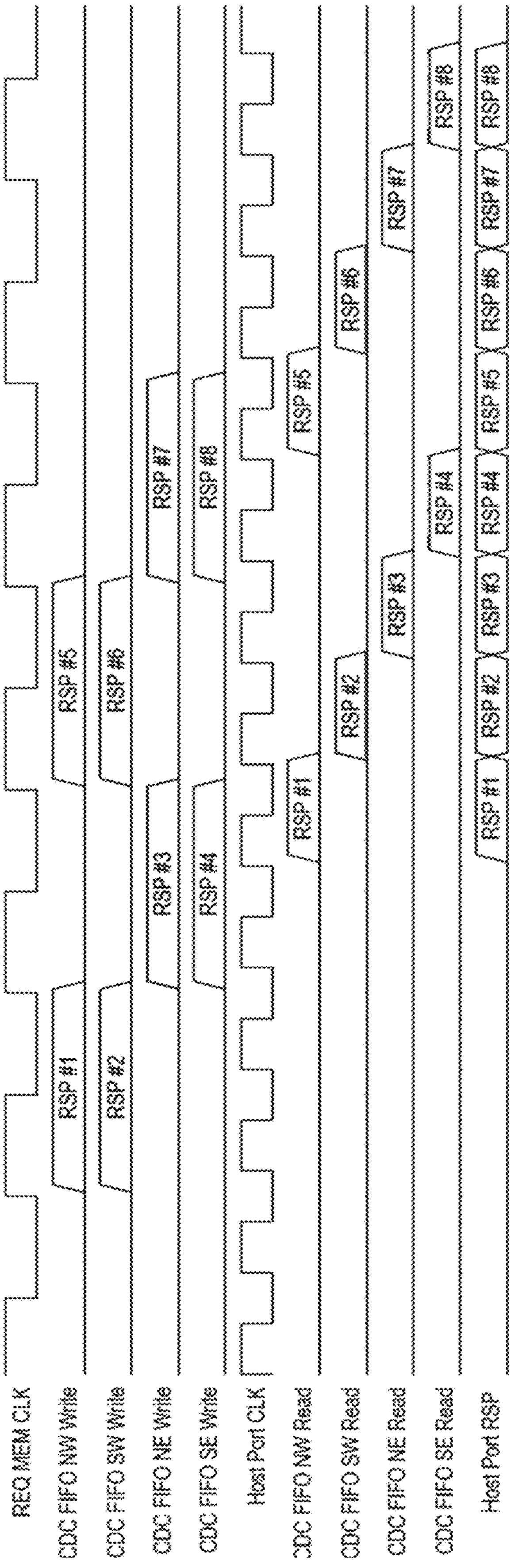
FIG. 7 illustrates clock cycles for a response path in a local memory, in accordance with various embodiments.

FIG. 7 illustrates clock cycles for a response path in a local memory, in accordance with various embodiments. The local memory in the embodiments of FIG. 7 may be an embodiment of the local memory 400 of FIG. 5. The response path may be an embodiment of the response path described above in conjunction with FIG. 5. There are two clock domains in the embodiments of FIG. 7: the first clock domain is represented by the clock of the memory banks (shown as "REQ MEM CLK" in FIG. 7), and the second clock domain is represented by the clock for the host port (shown as "Host Port CLK" in FIG. 7). The first clock domain has a lower frequency and is slower than the second clock domain. In other embodiments, there may be more than two clock domains.

Eight responses (RSP #1 through RSP #8) are written into four CDC FIFO buffers following the clock cycles of the first clock domain. Each CDC FIFO buffer may be an embodiment of the CDC buffers 465 in FIG. 5. Four clock cycles are used for writing the eight requests into the CDC FIFO buffers. As shown in FIG. 7, the first response (RSP #1) and the fifth response (RSP #5) are written into a first CDC FIFO buffer ("CDC FIFO NW" in FIG. 7) in the first and third clock cycles of the four clock cycles. The second response (RSP #2) and the fifth response (RSP #6) are written into a second CDC FIFO buffer ("CDC FIFO SW" in FIG. 7) in the first and third clock cycles of the four clock cycles. The third response (RSP #3) and the seventh response (RSP #7) are written into a third CDC FIFO buffer ("CDC FIFO NE" in FIG. 7) in the second and fourth clock cycles of the four clock cycles. The fourth response (RSP #4) and the eighth response (RSP #8) are written into a fourth CDC FIFO buffer ("CDC FIFO SE" in FIG. 7) in the second and fourth clock cycles of the four clock cycles.

Reading the responses from the CDC FIFO buffers follow the clock cycles of the second clock domain. The eight responses are read within eight consecutive clock cycles. The first response (RSP #1) and the fifth response (RSP #5) are read from the first CDC FIFO buffer ("CDC FIFO NW" in FIG. 7) in the first and fifth clock cycles of the eight clock cycles. The second response (RSP #2) and the fifth response (RSP #6) are read from the second CDC FIFO buffer ("CDC FIFO SW" in FIG. 7) in the second and sixth clock cycles of the eight clock cycles. The third response (RSP #3) and the seventh response (RSP #7) are read from the third CDC FIFO buffer ("CDC FIFO NE" in FIG. 7) in the third and seventh clock cycles of the eight clock cycles. The fourth response (RSP #4) and the eighth response (RSP #8) are read from the fourth CDC FIFO buffer ("CDC FIFO SE" in FIG. 7) in the fourth and eighth clock cycles of the eight clock cycles.

The host port associated with the local memory receives the eight responses from the CDC FIFO buffers. As shown in FIG. 7, the host port receives each response in the cycle when the response is read from the CDC FIFO. With the multiple CDC FIFO buffers, the bandwidth utilization reaches 100% in the embodiments of FIG. 7.

With the multiple CDC FIFO buffers, the bandwidth utilization can reach 100% in the embodiments of FIG. 7. As described above, consecutive responses can be pulled in parallel from different bank groups that are coupled to the different CDC FIFO buffers. Transactions from multiple bank groups may flow simultaneously back to the host port. As, read is done by PEs port which utilizes the faster clock domain, no excessive CDC FIFO fill or backpressure can be observed. The multi-bank group design of the local memory can avoid scenarios where CDC FIFO becomes full, and backpressure the host port.

Figure 8:
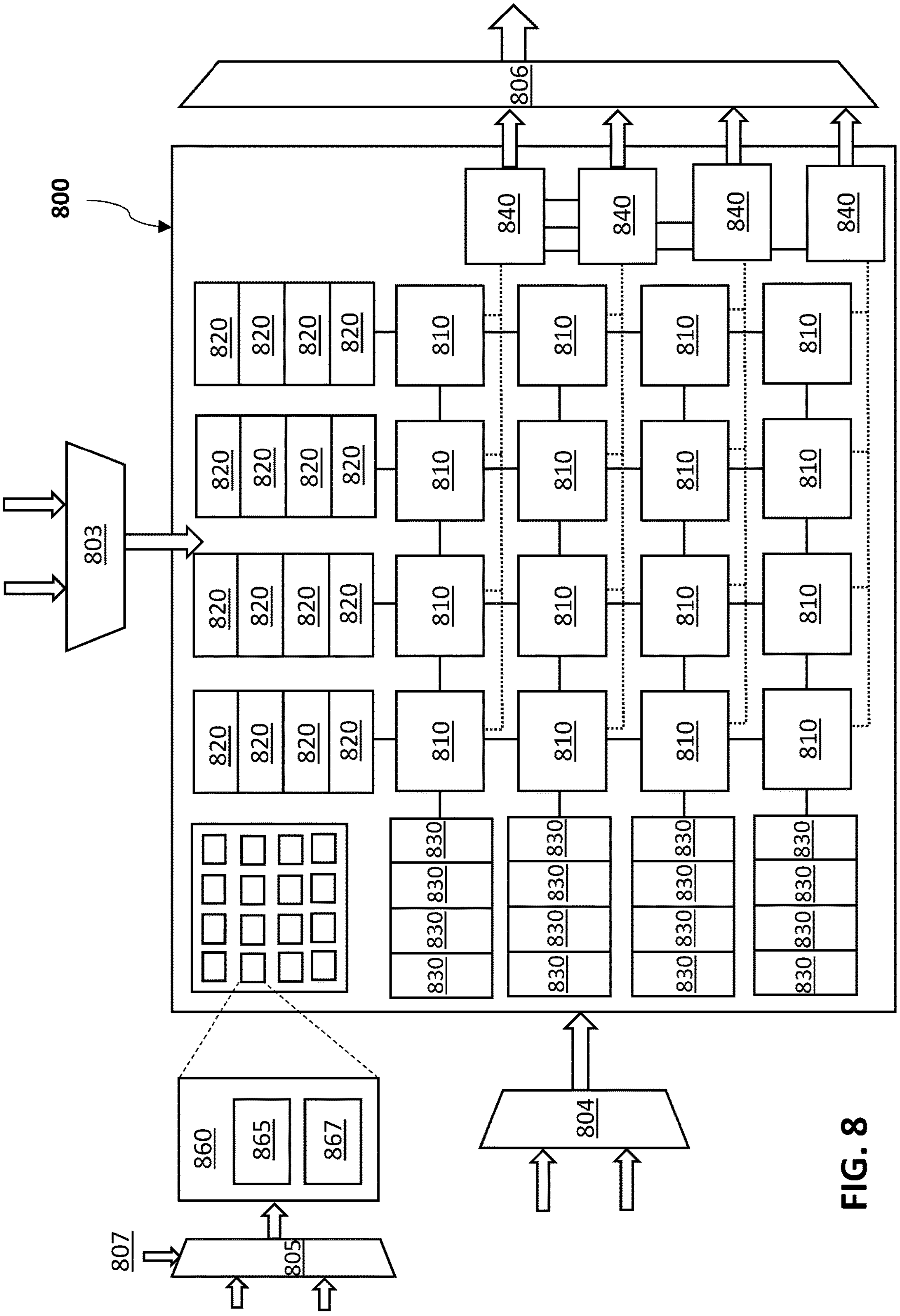
FIG. 8 illustrates an example sparse cell, in accordance with various embodiments.

FIG. 8 illustrates an example sparse cell 800, in accordance with various embodiments. The sparse cell 800 may be a processing cell in a processing engine, e.g., the processing engine 360 in FIG. 3. The sparse cell 800 includes 16 MAC units 810 (individually referred to as "MAC unit 810"), which constitutes a MAC array having four rows and four columns. The MAC array has a spatial shape of 4×4, meaning the height of the MAC array is four and the width of the MAC array is also 8. The sparse cell 800 also includes 16 weight register files 820 (individually referred to as "weight register file 820"), 16 activation register files 830 (individually referred to as "activation register file 830"), four row buffers 840 (individually referred to as "row buffer 840"), and acceleration modules 860 (individually referred to as "acceleration module 860"). In other embodiments, the sparse cell 800 may include fewer, more, or different components. For example, the sparse cell 800 may include a different number of MAC units 810, weight register files 820, activation register files 830, row buffers 840, or acceleration modules 860. As another example, the sparse cell 800 may include column buffers in lieu of or in addition to the row buffers 840. Also, the shape (e.g., the height or width) of the MAC array may be different.

The MAC units 810 are configured to perform MAC operations. Each MAC unit 810 may include one or more multipliers and one or more adders. A multiplier may multiply an activation with a weight at a time to compute a product. In some embodiments (e.g., embodiments where the MAC unit 810 includes multiple multipliers), the multipliers may operate simultaneously to process multiple activation-weight pairs and compute multiple products in one cycle. An adder may accumulate products computed by the multipliers. Even though not shown in FIG. 8, the sparse cell may include an adder tree including a plurality of adder tiers. The first tier may receive outputs of a plurality of MAC units 810. The number of adders in the first tier may be half of the number of the MAC units 810, and each adder may accumulate the outputs of two MAC units 810. The second tier may receive outputs of adders in the first tier. The number of adders in the second tier may be half of the number of adders in the first tier, and each adder in the second tier may accumulate the outputs of two adders in the first tier. The adder tree may include one or more other tiers. The last tier may include a single adder that accumulates outputs of adders in the second last tier to compute a partial sum of the sparse cell 800.

The weight register files 820 store weights to be processed in MAC operations. In the embodiments of FIG. 8, four weight register files 820 are grouped into a storage set that stores data to be used by a column of MAC units 810. There are four storage sets corresponding to the four columns of MAC units 810. In some embodiments, a weight register file 820 may correspond to a MAC unit 810 and store data to be processed by the MAC unit. In some embodiments, all the 16 weight register files 820 constitute a weight storage unit.

The activation register files 830 stores activations to be processed in MAC operations. In the embodiments of FIG. 8, four activation register files 830 are grouped into a storage set that stores data to be used by a row of MAC units 810. There are four storage sets corresponding to the four rows of MAC units 810. In some embodiments, an activation register file 830 may correspond to a MAC unit 810 and store data to be processed by the MAC unit. In some embodiments, all the 16 activation register files 830 constitute an activation storage unit. The row buffers 840 store outputs of the MAC units 810. Each row buffer 840 may drain outputs of a single row of MAC units 810.

The acceleration module 860 facilitates acceleration of computations in the sparse cell 800 based on mixed formats of weights. In the embodiments of FIG. 8, each acceleration module 860 may control acceleration of computations in a different MAC unit 810. The number of acceleration modules 860 in the sparse cell 800 is the same as the number of MAC units 810 in the sparse cell 800. In other embodiments, an acceleration module 860 may control acceleration in multiple MAC units 810. As shown FIG. 8, each acceleration module 860 includes a storage unit 865 and a control logic 867. The storage unit 865 stores mixed-format maps. The control logic 867 may control distributions of activations and weights stored from the weight register files 820 and the activation register files 830 to the MAC units 810 based on mixed-format maps. In some embodiments, the control logic 867 may distribute a weight operand and a corresponding activation operation to a MAC unit 810 for an MAC operation. The weight operand may be a subblock (e.g., a column) of a weight block. All the weights in the weight operand may be in the same output channel and have the same spatial position, but the weights may be in different input channels from each other.

In some embodiments, a weight operand may include one or more uncompressed weight and one or more compressed weights. The control logic 867 may distribute compressed weights to MAC units 810 in a different manner from which the control logic 867 distributes uncompressed weights. In some embodiments (e.g., embodiments in which the compressed weights are zeros), the control logic 867 may select nonzero weights stored in the weight register files 820 based on the mixed-format map and distribute these nonzero weights to the MAC unit 810 for computation. The control logic 867 may also distribute activations, which correspond to the nonzero weights, to the MAC unit 810 from in the activation register files 830. The control logic 867 may ignore zero weights and activations corresponding the zero weights so that these weights and activations can be skipped from computation.

In other embodiments (e.g., embodiments in which the compressed weights have a lower precision than the uncompressed weights), the control logic 867 may distribute both compressed weights and uncompressed weights to the MAC unit 810 but in different manners. For example, the control logic 867 may distribute one compressed weight to the MAC unit 810 for one computation cycle of the MAC unit 810 but distribute one uncompressed weight to the MAC unit 810 for multiple computation cycles of the MAC unit 810. The MAC unit 810 may have a multiplier that can compute a product of a compressed weight with its corresponding activation in one computation cycle. The multiplier may compute multiple products for an uncompressed weight. Each of these products may be a result of multiplying a portion of the uncompressed weight with the corresponding activation in one computation cycle. One or more of these products may be shifted and then accumulated with one or more other products to compute the product of the uncompressed weight and the activation. As another example, the control logic 867 may distribute multiple compressed weights to the MAC unit 810 for one computation cycle of the MAC unit 810 but distribute one uncompressed weight to the MAC unit 810 for one computation cycle of the MAC unit 810. The MAC unit 810 in this example may have multiple multipliers that can compute multiple products for a uncompressed weight in one operating cycle, in which each multiplier may multiply a portion of the uncompressed weight with the corresponding activation. Each multiplier may multiply a compressed weight with the corresponding activation in one compute cycle so that multiple multipliers can handle multiple uncompressed weights in one computation cycle.

As shown in FIG. 8, the sparse cell 800 is associated with multiplexers (MUXs) 803, 804, 805, and 806. In other embodiments, the sparse cell 800 may be associated with a different number of MUXs or other devices. The MUX 803 facilitates loading weights, e.g., from the local memory 340, into the weight register files 820. The MUX 804 facilitates loading activations, e.g., from the local memory 340, into the activation register files 830. The MUX 805 facilitates loading mixed-format maps into the storage unit 865. The MUX 806 may be a drain MUX that can facilitate draining outputs of the MAC units 810, e.g., to the local memory 340.

Figure 9:
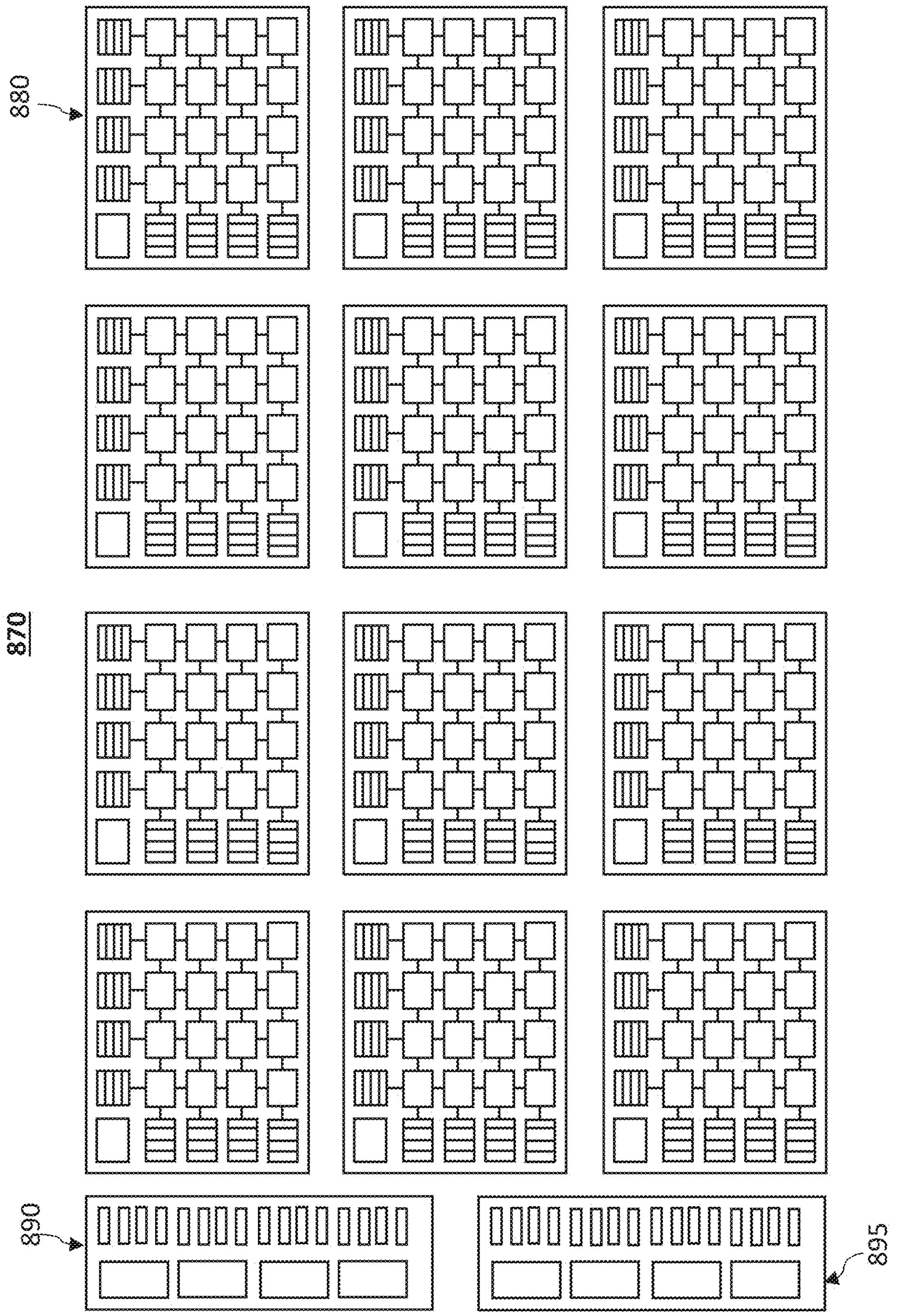
FIG. 9 illustrates an example sparse cell array, in accordance with various embodiments.

FIG. 9 illustrates a sparse cell array 870, in accordance with various embodiments. The sparse cell array 870 may be an example of the processing engine 360 in FIG. 3. In FIG. 9, the sparse cell array 870 includes sparse cells 880 (individually referred to as "sparse cell 880") arranged in four columns and four rows, an activation memory 890, and a weight memory 895. In other embodiments, the sparse cell array 870 may include fewer, more, or different components. For instance, the sparse cell array 870 may include a different number of columns, rows, or sparse cells 880.

Each sparse cell 880 may perform accelerated MAC operations. MAC operations in the sparse cells 880 may be accelerated based on mixed formats of weights. An embodiment of a sparse cell 880 may be the sparse cell 800 in FIG. 8. The activation memory 890 stores activations, such as activations in input tensors of neural network operations. Activations may be loaded from the activation memory 890 to sparse cells 880, e.g., to activation register files. The weight memory 895 stores weights, such as weights in filters of neural network operations. Weights may be loaded from the weight memory 895 to sparse cells 880, e.g., to weight register files. The activation memory 890 or weight memory 895 may be a buffer.

Figure 10:
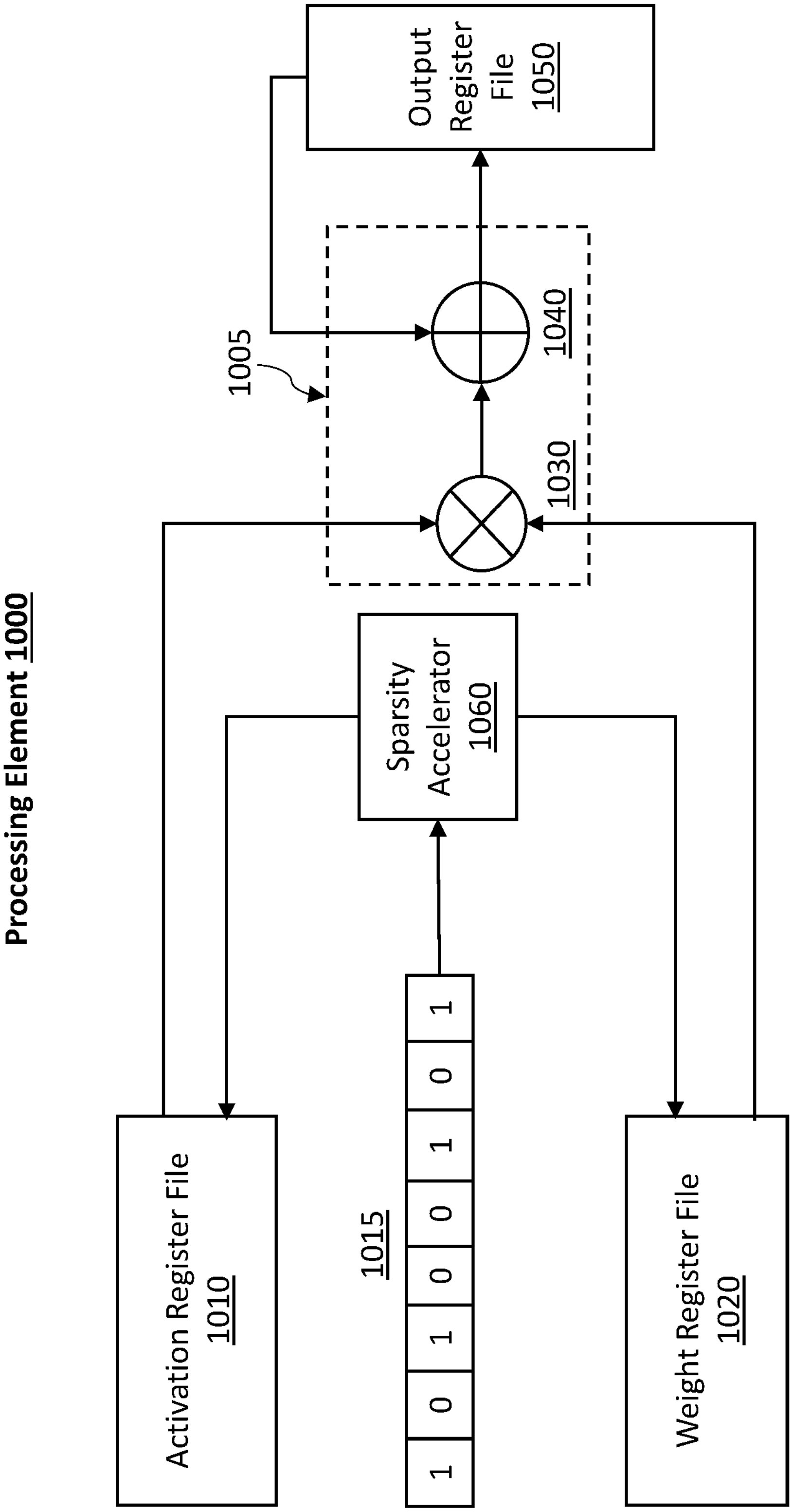
FIG. 10 illustrates an example processing element (PE), in accordance with various embodiments.

FIG. 10 illustrates an example PE 1000, in accordance with various embodiments. The PE 1000 may be a unit component of a processing cell, e.g., a processing cell in the processing engine 370. In the embodiments of FIG. 10, the PE 1000 includes an MAC unit 1005, an activation register file 1010, a weight register file 1020, an output register file 1050, and a sparsity accelerator 1060. The MAC unit 1005 includes a multiplier 1030 and an adder 1040. In other embodiments, the PE 1000 may include fewer, more, or different components.

The activation register file 1010 stores an activation operand, which may be a context. The activation register file 1010 may be an example of the activation register files 930 in FIG. 9. The weight register file 1020 stores a weight operand. The weight register file 1020 may be an example of the weight register files 920 in FIG. 9. The activation operand and weight operand may be loaded from a memory (e.g., the memory 340) into the activation register file 1010 and the weight register file 1020, respectively. The sparsity accelerator 1060 receives a sparsity bitmap 1015 that corresponds to the sparse tensor in the weight register file 1020. The sparsity bitmap 1015 may be a combined sparsity bitmap when the MAC unit 1005 operates in a combined compute mode. The sparsity bitmap 1015 may be an activation sparsity bitmap when the MAC unit 1005 operates in an activation compute mode. The sparsity bitmap 1015 may be a weight sparsity bitmap when the MAC unit 1005 operates in a weight compute mode. The sparsity bitmap 1015 may have the same size (e.g., the same number of elements) as or a larger size than the activation operand or the weight operand.

Using the sparsity bitmap 1015, the sparsity accelerator 1060 selects four activations from the activation register file 1010 and selects four weights from the weight register file 1020. The sparsity accelerator 1060 transmits the selected activations and weights to the multiplier 1030. These selected data elements correspond to the nonzero elements of the sparsity bitmap 1015. The four selected activations and the four selected weights may constitute four activation-weight pairs. The multiplier 1030 may compute a product based on each activation-weight pair and therefore, compute four products in total. The four products may be provided to the adder 1040. Even though FIG. 10 shows a single multiplier 1030, the MAC unit 1005 may include multiple multipliers that can perform multiple multiplication operations at the same time.

The adder 1040 accumulates the four products and computes a unit-level internal partial sum. The four unselected elements of the dense tensor are not processed to save power and time, which would not impact the value of the unit-level internal partial sum. For instance, when the dense tensor is a dense activation tensor, the weights corresponding to the unselected activations are zeros so the products of the unselected activations and the weights would all be zero and have no contribution to the unit-level internal partial sum or other partial sums computed by the sparse cell. Similarly, when the dense tensor is a dense weight tensor, the activations corresponding to the unselected weights are zeros so the products of the unselected weights and the activations would all be zero and have no contribution to the unit-level internal partial sum or other partial sums computed by the sparse cell. In other embodiments, the MAC unit 1005 may operate in a dense mode in which the sparsity bitmap 1015 is not used and the sparsity accelerator 1060 is inactive. The MAC unit 1005 may process all the activations in the activation operand and all the weights in the weight operand.

The unit-level internal partial sum may be stored in the output register file 1050. In some embodiments, the unit-level internal partial sum may be used multiple times. For instance, the activation operand may represent N data blocks in the input tensor of the convolution, where N is an integer greater than 1. Instead of processing all the N data blocks to compute N unit-level internal partial sums, the unit-level internal partial sum is computed once and used N times in the convolutional layers as N unit-level internal partial sums.

In some embodiments, the PE 1000 receives one or more PE-level internal partial sums from one or more other PEs. The adder 1040 or an accumulator (not shown in FIG. 10) can accumulate the one or more PE-level internal partial sums with the PE-level internal partial sum of the PE 1000 and store the result of the accumulation (i.e., a multi-PE internal partial sum) in the output register file 1050. The one or more other PEs may be in the same column as the PE 1000 in a sparse cell. The multi-unit internal partial sum may be a column-level internal partial sum. In some embodiments, the PE-level internal partial sum of the PE 1000 or the multi-unit internal partial sum may be sent to one or more other PEs for further accumulation.

Figure 11:
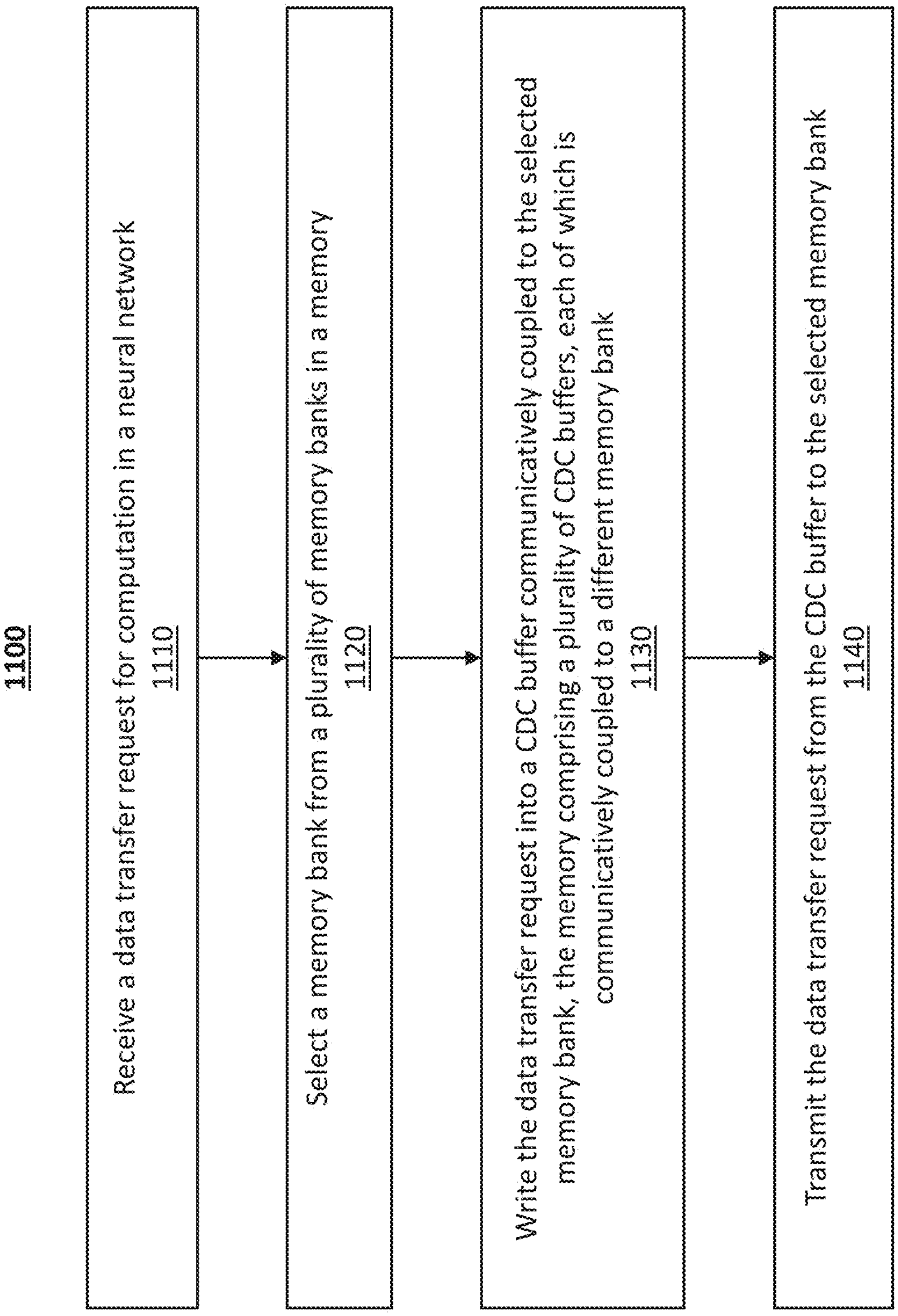
FIG. 11 is a flowchart showing a method of data transfer for deep learning, in accordance with various embodiments.

FIG. 11 is a flowchart showing a method 1100 of data transfer for deep learning, in accordance with various embodiments. The method 1100 may be performed by the local memory 340 in FIG. 3. Although the method 1100 is described with reference to the flowchart illustrated in FIG. 11, many other methods of data transfer for deep learning may alternatively be used. For example, the order of execution of the steps in FIG. 11 may be changed. As another example, some of the steps may be changed, eliminated, or combined.

The local memory 340 receives 1110, from one or more PEs, a data transfer request for computation in a neural network. In some embodiments, the one or more PEs may be the processing engine 360 or post-processing engine 370 in FIG. 3.

The local memory 340 selects 1120, by one or more bank selection modules in the local memory 340, a memory bank from a plurality of memory banks in the local memory 340. In some embodiments, a bank selection module comprises a demultiplexer.

In some embodiments, the memory banks are arranged in a plurality of bank groups. The local memory 340 selects, by a group selection module in the local memory 340, a bank group from the plurality of bank groups. The one or more bank selection modules comprise a bank selection module corresponding to the selected bank group. The local memory 340 transmits the data transfer request to the bank selection module. In some embodiments, the group selection module is in a first clock domain, and the one or more bank selection modules are in a second clock domain that is slower than the first clock domain.

The local memory 340 writes 1130 the data transfer request into a CDC buffer communicatively coupled to the selected memory bank. The memory comprises a plurality of CDC buffers, each of which is communicatively coupled to a different memory bank. In some embodiments, each CDC buffer is arranged between a different memory bank and a bank selection module along a different data path in the memory. In some embodiments, a data path comprises one or more interconnects.

The local memory 340 transmits 1140 the data transfer request from the CDC buffer to the selected memory bank. In some embodiments, the local memory 340 also transmits a response to the data transfer request from the selected memory bank to an additional CDC buffer communicatively coupled to the selected memory bank. The local memory 340 stores the response to the data transfer request in the additional CDC buffer.

Figure 12:
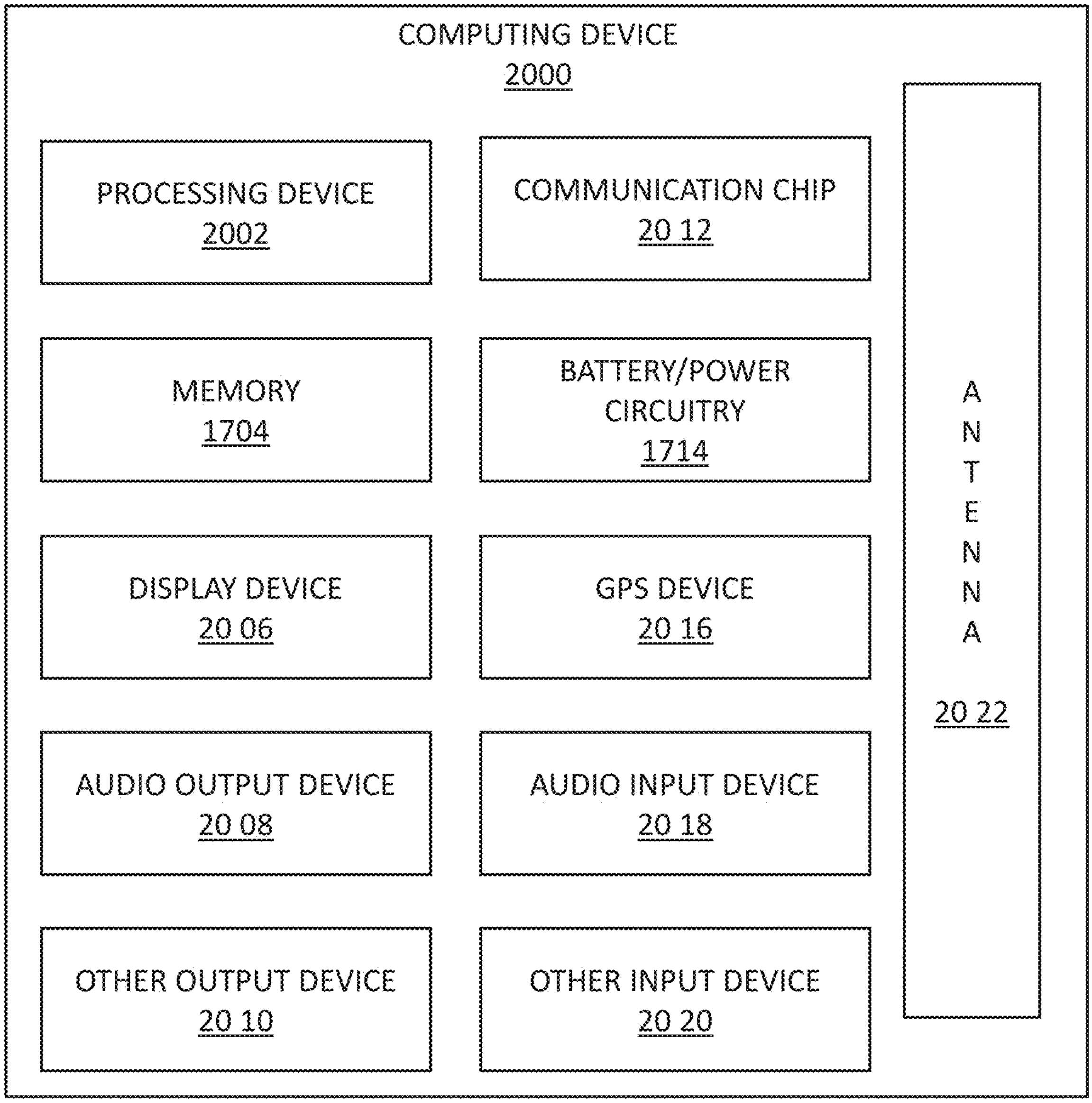
FIG. 12 is a block diagram of an example computing device, in accordance with various embodiments.

FIG. 12 is a block diagram of an example computing device 2000, in accordance with various embodiments. In some embodiments, the computing device 2000 can be used as at least part of the DNN system 300. A number of components are illustrated in FIG. 12 as included in the computing device 2000, but any one or more of these components may be omitted or duplicated, as suitable for the application. In some embodiments, some or all of the components included in the computing device 2000 may be attached to one or more motherboards. In some embodiments, some or all of these components are fabricated onto a single system on a chip (SoC) die. Additionally, in various embodiments, the computing device 2000 may not include one or more of the components illustrated in FIG. 12, but the computing device 2000 may include interface circuitry for coupling to the one or more components. For example, the computing device 2000 may not include a display device 2006, but may include display device interface circuitry (e.g., a connector and driver circuitry) to which a display device 2006 may be coupled. In another set of examples, the computing device 2000 may not include an audio input device 2018 or an audio output device 2008 but may include audio input or output device interface circuitry to which an audio input device 2018 or audio output device 2008 may be coupled.

The computing device 2000 may include a processing device 2002 (e.g., one or more processing devices). The processing device 2002 processes electronic data from registers and/or memory to transform that electronic data into other electronic data that may be stored in registers and/or memory. The computing device 2000 may include a memory 2004, which may itself include one or more memory devices such as volatile memory (e.g., DRAM), nonvolatile memory (e.g., read-only memory (ROM)), high bandwidth memory (HBM), flash memory, solid state memory, and/or a hard drive. In some embodiments, the memory 2004 may include memory that shares a die with the processing device 2002. In some embodiments, the memory 2004 includes one or more non-transitory computer-readable media storing instructions executable to perform operations for executing DNNs (e.g., the method 1600 described in conjunction with FIG. 11) or some operations performed by one or more components of the DNN system 300. The instructions stored in the one or more non-transitory computer-readable media may be executed by the processing device 2002.

In some embodiments, the computing device 2000 may include a communication chip 2012 (e.g., one or more communication chips). For example, the communication chip 2012 may be configured for managing wireless communications for the transfer of data to and from the computing device 2000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 2012 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication chip 2012 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 2012 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 2012 may operate in accordance with Code-division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 2012 may operate in accordance with other wireless protocols in other embodiments. The computing device 2000 may include an antenna 2022 to facilitate wireless communications and/or to receive other wireless communications (such as AM or FM radio transmissions).

In some embodiments, the communication chip 2012 may manage wired communications, such as electrical, optical, or any other suitable communication protocols (e.g., the Ethernet). As noted above, the communication chip 2012 may include multiple communication chips. For instance, a first communication chip 2012 may be dedicated to shorter-range wireless communications such as Wi-Fi or Bluetooth, and a second communication chip 2012 may be dedicated to longer-range wireless communications such as global positioning system (GPS), EDGE, GPRS, CDMA, WiMAX, LTE, EV-DO, or others. In some embodiments, a first communication chip 2012 may be dedicated to wireless communications, and a second communication chip 2012 may be dedicated to wired communications.

The computing device 2000 may include battery/power circuitry 2014. The battery/power circuitry 2014 may include one or more energy storage devices (e.g., batteries or capacitors) and/or circuitry for coupling components of the computing device 2000 to an energy source separate from the computing device 2000 (e.g., AC line power).

The computing device 2000 may include a display device 2006 (or corresponding interface circuitry, as discussed above). The display device 2006 may include any visual indicators, such as a heads-up display, a computer monitor, a projector, a touchscreen display, a liquid crystal display (LCD), a light-emitting diode display, or a flat panel display, for example.

The computing device 2000 may include an audio output device 2008 (or corresponding interface circuitry, as discussed above). The audio output device 2008 may include any device that generates an audible indicator, such as speakers, headsets, or earbuds, for example.

The computing device 2000 may include an audio input device 2018 (or corresponding interface circuitry, as discussed above). The audio input device 2018 may include any device that generates a signal representative of a sound, such as microphones, microphone arrays, or digital instruments (e.g., instruments having a musical instrument digital interface (MIDI) output).

The computing device 2000 may include a GPS device 2016 (or corresponding interface circuitry, as discussed above). The GPS device 2016 may be in communication with a satellite-based system and may receive a location of the computing device 2000, as known in the art.

The computing device 2000 may include another output device 2010 (or corresponding interface circuitry, as discussed above). Examples of the other output device 2010 may include an audio codec, a video codec, a printer, a wired or wireless transmitter for providing information to other devices, or an additional storage device.

The computing device 2000 may include another input device 2020 (or corresponding interface circuitry, as discussed above). Examples of the other input device 2020 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 2000 may have any desired form factor, such as a handheld or mobile computer system (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computer system, a server or other networked computing component, a printer, a scanner, a monitor, a set-top box, an entertainment control unit, a vehicle control unit, a digital camera, a digital video recorder, or a wearable computer system. In some embodiments, the computing device 2000 may be any other electronic device that processes data.

The following paragraphs provide various examples of the embodiments disclosed herein.

Example 1 provides a computer memory for deep learning, the computer memory including a plurality of memory banks; a plurality of CDC buffers, different ones of the plurality of CDC buffers communicatively coupled to different ones of the plurality of memory banks; and one or more bank selection modules configured to select a memory bank from the plurality of memory banks for a data transfer request for computation in a neural network, in which a CDC buffer communicatively coupled to the selected memory bank is configured to store the data transfer request before the data transfer request is transmitted to the selected memory bank.

Example 2 provides the computer memory of example 1, in which the memory banks are arranged in a plurality of bank groups, and the computer memory further includes a group selection module configured to: receive the data transfer request; select a bank group from the plurality of bank groups, in which the one or more bank selection modules include a bank selection module corresponding to the selected bank group; and transmit the data transfer request to the bank selection module.

Example 3 provides the computer memory of example 2, in which the group selection module is in a first clock domain, and the one or more bank selection modules are in a second clock domain that is slower than the first clock domain.

Example 4 provides the computer memory of any one of examples 1-3, further including data paths, in which each CDC buffer is arranged between a different memory bank and a bank selection module along a different data path.

Example 5 provides the computer memory of any one of examples 1-4, further including additional CDC buffers, in which each memory bank is communicatively coupled to a different one of the CDC buffer and a different one of the additional CDC buffer.

Example 6 provides the computer memory of example 5, in which an additional CDC buffer communicatively coupled to the selected memory bank is configured to store a response to the data transfer request before the response is transmitted to the one or more bank selection modules.

Example 7 provides the computer memory of any one of examples 1-6, in which a bank selection module includes a demultiplexer.

Example 8 provides an apparatus for deep learning, the apparatus including one or more PEs, each processing element configured to perform a deep learning operation; and a memory including a plurality of memory banks, a plurality of CDC buffers, different ones of the plurality of CDC buffers communicatively coupled to different ones of the plurality of memory banks, and one or more bank selection modules configured to select a memory bank from the plurality of memory banks for a data transfer request for computation in a neural network, the data transfer request including data computed or to be used by the one or more processing elements, in which a CDC buffer communicatively coupled to the selected memory bank is configured to store the data transfer request before the data transfer request is transmitted to the selected memory bank.

Example 9 provides the apparatus of example 8, in which the memory banks are arranged in a plurality of bank groups, and the memory further includes a group selection module configured to: receive the data transfer request; select a bank group from the plurality of bank groups, in which the one or more bank selection modules include a bank selection module corresponding to the selected bank group; and transmit the data transfer request to the bank selection module.

Example 10 provides the apparatus of example 9, in which the group selection module is in a first clock domain, and the one or more bank selection modules are in a second clock domain that is slower than the first clock domain.

Example 11 provides the apparatus of any one of examples 8-10, in which the memory further includes data paths, and each CDC buffer is arranged between a different memory bank and a bank selection module along a different data path.

Example 12 provides the apparatus of any one of examples 8-11, in which the memory further includes additional CDC buffers, in which each memory bank is communicatively coupled to a different one of the CDC buffer and a different one of the additional CDC buffer.

Example 13 provides the apparatus of example 12, in which an additional CDC buffer communicatively coupled to the selected memory bank is configured to store a response to the data transfer request before the response is transmitted to the one or more bank selection modules.

Example 14 provides the apparatus of any one of examples 8-13, in which a bank selection module includes a demultiplexer.

Example 15 provides a method for deep learning, including receiving, by a memory from one or more processing elements, a data transfer request for computation in a neural network; selecting, by one or more bank selection modules in the memory, a memory bank from a plurality of memory banks in the memory; writing the data transfer request into a CDC buffer communicatively coupled to the selected memory bank, the memory including a plurality of CDC buffers, each of which is communicatively coupled to a different memory bank; and transmitting the data transfer request from the CDC buffer to the selected memory bank.

Example 16 provides the method of example 15, in which the memory banks are arranged in a plurality of bank groups, and the method further includes selecting, by a group selection module in the memory, a bank group from the plurality of bank groups, in which the one or more bank selection modules include a bank selection module corresponding to the selected bank group; and transmit the data transfer request to the bank selection module.

Example 17 provides the method of example 16, in which the group selection module is in a first clock domain, and the one or more bank selection modules are in a second clock domain that is slower than the first clock domain.

Example 18 provides the method of any one of examples 15-17, in which each CDC buffer is arranged between a different memory bank and a bank selection module along a different data path in the memory.

Example 19 provides the method of any one of examples 15-18, further including transmitting a response to the data transfer request from the selected memory bank to an additional CDC buffer communicatively coupled to the selected memory bank; and storing the response to the data transfer request in the additional CDC buffer.

Example 20 provides the method of any one of examples 15-19, in which a bank selection module includes a demultiplexer.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A memory device for deep learning, the memory device comprising:

a plurality of memory banks;

a plurality of clock domain crossing (CDC) buffers, different ones of the plurality of CDC buffers communicatively coupled to different ones of the plurality of memory banks;

a bank selection module configured to select a memory bank from the plurality of memory banks for a one or more data transfer requests for computation in a neural network; and a plurality of arbiters, different ones of the plurality of arbiters communicatively coupled to different ones of the plurality of CDC buffers, an arbiter arranged between the bank selection module and a CDC buffer communicatively coupled to the selected memory bank, wherein the arbiter is to receive the one or more data transfer requests from the bank selection module and to schedule storage of the one or more data transfer requests into the CDC buffer communicatively coupled to the selected memory bank.

2. The computer-memory device of claim 1, wherein the plurality of memory banks are arranged in a bank group of a plurality of bank groups, and the memory device further comprises a group selection module configured to:

receive the data transfer request;

select a bank group from the plurality of bank groups, the bank selection module corresponding to the selected bank group; and transmit the data transfer request to the bank selection module.

3. The memory device of claim 2, wherein the group selection module is in a first clock domain, and the bank selection module is in a second clock domain that is slower than the first clock domain.

4. The memory device of claim 1, further comprising data paths, wherein each CDC buffer is arranged between a different memory bank and the bank selection module along a different data path.

5. The memory device of claim 1, further comprising additional CDC buffers, wherein each memory bank is communicatively coupled to a different one of the CDC buffer and a different one of the additional CDC buffer.

6. The memory device of claim 5, wherein an additional CDC buffer communicatively coupled to the selected memory bank is configured to store a response to the data transfer request before the response is transmitted to the bank selection module.

7. The memory device of claim 1, wherein the bank selection module comprises a demultiplexer.

8. An apparatus for deep learning, the apparatus comprising:

one or more processing elements, each processing element configured to perform a deep learning operation; and a memory device comprising:

a plurality of memory banks, a plurality of clock domain crossing (CDC) buffers, different ones of the plurality of CDC buffers communicatively coupled to different ones of the plurality of memory banks, a bank selection module configured to select a memory bank from the plurality of memory banks for one or more data transfer requests for computation in a neural network, the one or more data transfer requests comprising data computed or to be used by the one or more processing elements, and a plurality of arbiters, different ones of the plurality of arbiters communicatively coupled to different ones of the plurality of CDC buffers, an arbiter arranged between the bank selection module and a CDC buffer communicatively coupled to the selected memory bank, wherein the arbiter is to receive the one or more data transfer requests from the bank selection module and to schedule storage of the one or more data transfer requests into the CDC buffer communicatively coupled to the selected memory bank.

9. The apparatus of claim 8, wherein the plurality of memory banks are arranged in a bank group of a plurality of bank groups, and the memory device further comprises a group selection module configured to:

receive the data transfer request;

select a bank group from the plurality of bank groups, the bank selection module corresponding to the selected bank group; and transmit the data transfer request to the bank selection module.

10. The apparatus of claim 9, wherein the group selection module is in a first clock domain, and the bank selection module is in a second clock domain that is slower than the first clock domain.

11. The apparatus of claim 8, wherein the memory device further comprises data paths, and each CDC buffer is arranged between a different memory bank and the bank selection module along a different data path.

12. The apparatus of claim 8, wherein the memory device further comprises additional CDC buffers, wherein each memory bank is communicatively coupled to a different one of the CDC buffer and a different one of the additional CDC buffer.

13. The apparatus of claim 12, wherein an additional CDC buffer communicatively coupled to the selected memory bank is configured to store a response to the data transfer request before the response is transmitted to the one or more bank selection modules.

14. The apparatus of claim 8, wherein the bank selection module comprises a demultiplexer.

15. A method for deep learning, comprising:

receiving, by a memory device from one or more processing elements, a one or more data transfer requests for computation in a neural network;

selecting, by a bank selection module in the memory device, a memory bank from a plurality of memory banks in the memory device;

transferring, by the bank selection module to an arbiter of a plurality of arbiters, the one or more data transfer requests, the arbiter arranged between the bank selection module and a CDC buffer communicatively coupled to the selected memory bank;

determining, by the arbiter, an order of storing the one or more data transfer requests;

writing the one or more data transfer requests into the CDC buffer based on the order determined by the arbiter, the memory comprising plurality of CDC buffers, each of which is communicatively coupled to a different memory bank; and transmitting the one or more data transfer requests from the CDC buffer to the selected memory bank.

16. The method of claim 15, wherein the plurality of memory banks are arranged in a bank group of a plurality of bank groups, and the method further comprises:

selecting, by a group selection module in the memory, a bank group from the plurality of bank groups, the bank selection module corresponding to the selected bank group; and transmitting the one or more data transfer requests to the bank selection module.

17. The method of claim 16, wherein the group selection module is in a first clock domain, and the bank selection module is in a second clock domain that is slower than the first clock domain.

18. The method of claim 15, wherein each CDC buffer is arranged between a different memory bank and the bank selection module along a different data path in the memory device.

19. The method of claim 15, further comprising:

transmitting a response to the one or more data transfer request from the selected memory bank to an additional CDC buffer communicatively coupled to the selected memory bank; and storing the response to the data transfer request in the additional CDC buffer.

20. The method of claim 15, wherein the bank selection module comprises a demultiplexer.

* * * * *